US009781094B2

(12) United States Patent
Shahidi et al.

(10) Patent No.: US 9,781,094 B2
(45) Date of Patent: Oct. 3, 2017

(54) SYSTEMS AND METHODS FOR PERFORMING REMOTE AUTHENTICATION OF A VIRTUAL SUBSCRIBER IDENTITY MODULE (SIM)

(71) Applicant: QUALCOMM Incorporated, San Diego, CA (US)

(72) Inventors: Reza Shahidi, San Diego, CA (US); Yongsheng Shi, San Diego, CA (US); Michele Berionne, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 240 days.

(21) Appl. No.: 14/870,237

(22) Filed: Sep. 30, 2015

(65) Prior Publication Data

US 2016/0323256 A1 Nov. 3, 2016

Related U.S. Application Data

(60) Provisional application No. 62/153,646, filed on Apr. 28, 2015.

(51) Int. Cl.
*H04L 29/06* (2006.01)
*H04W 12/06* (2009.01)
(Continued)

(52) U.S. Cl.
CPC ............. *H04L 63/08* (2013.01); *H04L 63/18* (2013.01); *H04W 12/06* (2013.01); *H04W 60/005* (2013.01); *H04W 8/183* (2013.01)

(58) Field of Classification Search
CPC ........ H04L 63/08; H04L 63/18; H04W 12/06; H04W 60/005
See application file for complete search history.

(56) References Cited

U.S. PATENT DOCUMENTS 8,787,966 B2    7/2014  Altman
2003/0181216 A1*  9/2003  Tsai ...................... H04W 88/06
                                                        455/517
(Continued)

FOREIGN PATENT DOCUMENTS

CN    104185171 A    12/2014
WO    2014122588 A1    8/2014

OTHER PUBLICATIONS

International Search Report and Written Opinion—PCT/US2016/024886—ISA/EPO—dated Jun. 13, 2016.

*Primary Examiner* — William Powers
*Assistant Examiner* — Tongoc Tran
(74) *Attorney, Agent, or Firm* — The Marbury Law Group

(57) ABSTRACT

Various embodiments for performing remote authentication of a virtual subscriber identity module (SIM) on a mobile communication device include receiving, on a first subscription of the mobile communication device, an authentication request from a virtual SIM network. The mobile communication device may tune from the first subscription to a second subscription of the mobile communication device to send the authentication request to a remote server and periodically perform tune-aways between the first subscription and the second subscription while determining whether the remote server has sent an authentication response through the second subscription. The mobile communication device may send the authentication response to the virtual SIM network through the first subscription in response to determining that the remote server has sent an authentication response through the second subscription.

22 Claims, 12 Drawing Sheets

(51) Int. Cl.
*H04W 60/00* (2009.01)
*H04W 8/18* (2009.01)

(56) References Cited

U.S. PATENT DOCUMENTS

| | | | |
|---|---|---|---|
| 2010/0311468 A1* | 12/2010 | Shi | H04W 4/003 455/558 |
| 2011/0117965 A1* | 5/2011 | Gong | H04W 48/18 455/558 |
| 2012/0120821 A1* | 5/2012 | Kazmi | H04W 56/0005 370/252 |
| 2012/0250612 A1* | 10/2012 | Jalloul | H04B 7/0805 370/328 |
| 2013/0023275 A1* | 1/2013 | Mutya | H04W 88/06 455/452.1 |
| 2013/0109436 A1* | 5/2013 | Tat | H04W 88/06 455/558 |
| 2013/0165073 A1 | 6/2013 | Madsen | |
| 2013/0183081 A1* | 7/2013 | Oxley | F16B 7/0446 403/207 |
| 2013/0210421 A1* | 8/2013 | Mohseni | H04W 60/005 455/423 |
| 2013/0237197 A1 | 9/2013 | Ruvalcaba et al. | |
| 2013/0286853 A1* | 10/2013 | Shi | H04W 24/02 370/242 |
| 2013/0329639 A1 | 12/2013 | Wietfeldt et al. | |
| 2014/0245003 A1 | 8/2014 | Barker | |
| 2014/0342715 A1* | 11/2014 | Gu | G06F 9/455 455/418 |
| 2014/0380442 A1* | 12/2014 | Addepalli | H04W 4/046 726/6 |
| 2015/0057044 A1* | 2/2015 | Altman | H04W 4/003 455/558 |
| 2016/0037329 A1* | 2/2016 | Chong | H04W 76/02 455/422.1 |

* cited by examiner

SYSTEMS AND METHODS FOR PERFORMING REMOTE AUTHENTICATION OF A VIRTUAL SUBSCRIBER IDENTITY MODULE (SIM)

RELATED APPLICATIONS

This application claims the benefit of priority to U.S. Provisional Application No. 62/153,646 entitled "Systems and Methods for Performing Remote Authentication of a Virtual SIM" filed Apr. 28, 2015, the entire contents of which are hereby incorporated by reference.

BACKGROUND

Current wireless communication devices may be configured to support cellular network communications using a variety of technologies and formats depending on the service provider of choice. Examples of cellular networks include Third Generation (3G), Fourth Generation (4G), Long Term Evolution (LTE), Time Division Multiple Access (TDMA), Frequency Division Multiple Access (FDMA), Code Division Multiple Access (CDMA), Wideband CDMA (WCDMA), Time Division Synchronous CDMA (TD-SCDMA), Global System for Mobile Communications (GSM), and Universal Mobile Telecommunications Systems (UMTS). In order to store the necessary provisioning data that allows the mobile device to communicate with a wireless communications network, wireless communication devices may utilize a subscriber identity module (SIM) provided on a smart card such as a universal integrated circuit card (UICC).

Multi-SIM mobile communication devices have become increasingly popular because of their flexibility in service options and other features. For example, a dual-SIM dual-standby (DSDS) device is a type of multi-SIM mobile communication device configured with one radio frequency (RF) resource and two SIMs, and typically allows selective communication on a first network through a radio access technology (RAT) while listening for pages on a second network through another RAT. Multi-SIM communication devices may allow a user to implement two different wireless communication service subscriptions or plans with different service providers, with separate numbers and bills, on the same device (e.g., business account and personal account).

In a DSDS device, the two subscriptions share one RF resource. That means that when one subscription is active, the other subscription is idle and not using the RF resource. However, the idle subscription may periodically interrupt the active subscription to perform idle mode wakeup using the shared RF resource. This process of switching access of the shared RF resource from an active subscription to an idle subscription is sometimes referred to as a "tune-away" because the RF resource tunes away from the active subscription's frequency band or channel and tunes to the idle subscription's frequency bands or channels. After the idle subscription has finished network communications during the idle mode wakeup, access to the RF resource may tune from the idle subscription back to the active subscription (sometimes referred to herein as a "tune-back").

During travel, users may obtain and install local SIM cards in their mobile communication devices in order to pay local call rates in the destination country. By using multiple SIMs, a user may take advantage of different service pricing plans and save on mobile data usage. However, users may be limited by the number of UICCs supported by the multi-SIM mobile communication device (e.g., a dual-SIM device supports two UICCs). Further, users may be inconvenienced by having to use different telephone numbers (e.g., MSISDNs) for different local services, as well as by the barriers to accessing personal data (e.g., a contacts list that is normally stored on a SIM) across multiple SIMs. Moreover, while a user may obtain service while roaming from his or her home network operator without purchasing or installing additional SIMs, the user is often charged a very high fee for such service.

To overcome the costs and challenges of utilizing physical SIMs in a roaming environment, a virtual SIM (VSIM) may be implemented. A VSIM does not have to be implemented in hardware such as a UICC, but instead may be implemented in software, for example as a VSIM module stored in memory on the mobile communication device. The VSIM module works in conjunction with a remote server that contains an actual physical SIM card. The SIM card on the server, which may be termed a remote VSIM server or network SIM server, stores a SIM profile that may be sent to the VSIM module on the mobile communication device using the subscription supported by the device's physical SIM. Once the SIM profile is loaded in the VSIM module, the VSIM module may behave like a regular SIM card and support a subscription with a local network operator ("VSIM network").

Upon connecting to the VSIM network, the VSIM network sends an authentication request to the mobile communication device. The mobile communication device then performs a tune-away from the VSIM subscription and to the subscription on the physical SIM to communicate with the remote VSIM server, which provides authentication services. The mobile communication device remains tuned to the physical SIM subscription until it provides an authentication response. The mobile communication device then tunes back to the VSIM subscription and sends the authentication response to the VSIM network in order to utilize network services. However, due to timing issues associated with authenticating a VSIM with a remote VSIM server and the limitations imposed on use of a shared RF resource, it may be difficult for a multi-standby mobile communication device, such as a DSDS device, to complete the VSIM authentication request without dropping one or more network connections.

SUMMARY

Various embodiments include methods implemented on a mobile communication device for performing remote authentication of a virtual SIM on a mobile communication device. In various embodiments the methods may include receiving, on a first subscription of the mobile communication device, an authentication request from a virtual SIM network tuning from the first subscription to a second subscription of the mobile communication device to send the authentication request to a remote server, periodically performing tune-aways between the first subscription and the second subscription, determining whether the remote server has sent an authentication response through the second subscription, and sending the authentication response to the virtual SIM network through the first subscription in response to determining that the remote server has sent an authentication response through the second subscription.

In some embodiments, periodically performing tune-aways between the first subscription and the second subscription may include periodically performing a tune-away from the second subscription to the first subscription. In some embodiments, periodically performing tune-aways between the first subscription and the second subscription may include tuning from the second subscription to the first subscription, and periodically performing a tune-away from the first subscription to the second subscription. In such embodiments, the second subscription may communicate with the remote server in a circuit switched domain. In some embodiments, the mobile communication device may use a circuit switched domain number provided by the remote server to communicate with the remote server. In some embodiments, the methods may further include formatting the authentication request as a short message service (SMS) message to send to the remote server. In some embodiments, the authentication response sent by the remote server may be formatted as a SMS message.

In some embodiments, the second subscription may communicate with the remote server in a packet switched domain. Some embodiment methods may further include sending fake uplink data to the virtual SIM network using the first subscription while periodically performing tune-aways between the first subscription and the second subscription.

In various embodiments, methods implemented on a mobile communication device for performing remote authentication of a virtual SIM on a mobile communication device may include receiving, on a first subscription of the mobile communication device, an authentication request from a virtual SIM network tuning from the first subscription to a second subscription of the mobile communication device to send the authentication request to a remote server, determining whether the remote server has sent an authentication response through the second subscription, in which the mobile communication device restricts communication on the second subscription to authentication communication, and sending the authentication response to the virtual SIM network through the first subscription in response to determining that the remote server has sent an authentication response through the second subscription.

In some embodiments, the mobile communication device may restrict communication on the second subscription to authentication communication by setting a flag in a modem of the mobile communication device that indicates only authentication communication is permitted.

Various embodiments include methods implemented on a server for processing virtual subscriber identity module (SIM) authentication requests. Various embodiments may include providing to a mobile communication device, from a server configured to communicate in a circuit switched domain, a circuit switched domain number for communicating with the server, receiving an authentication request from the mobile communication device using the circuit switched domain number, in which the authentication request is generated by a virtual SIM network, and sending an authentication response to the mobile communication device using the circuit switched domain number.

In some embodiments, the authentication request and the authentication response may be formatted as short message service (SMS) messages. In some embodiments, the circuit switched domain number may be a mobile station international subscriber directory number.

Further embodiments include a mobile communication device including an RF resource, a user identity module, and a processor configured with processor-executable instructions to perform operations of the methods described above. Further embodiments include a server including a processor configured with processor-executable instructions to perform operations of the methods described above. Further embodiments include a non-transitory processor-readable storage medium having stored thereon processor-executable software instructions configured to cause a processor to perform operations of the methods described above. Further embodiments include a mobile communication device that includes means for performing functions of the operations of the methods described above. Further embodiments include a server that includes means for performing functions of the operations of the methods described above.

BRIEF DESCRIPTION OF THE DRAWINGS

The accompanying drawings, which are incorporated herein and constitute part of this specification, illustrate exemplary embodiments, and together with the general description and the detailed description given herein, serve to explain the features of the disclosed systems and methods.

DETAILED DESCRIPTION

Figure 1:
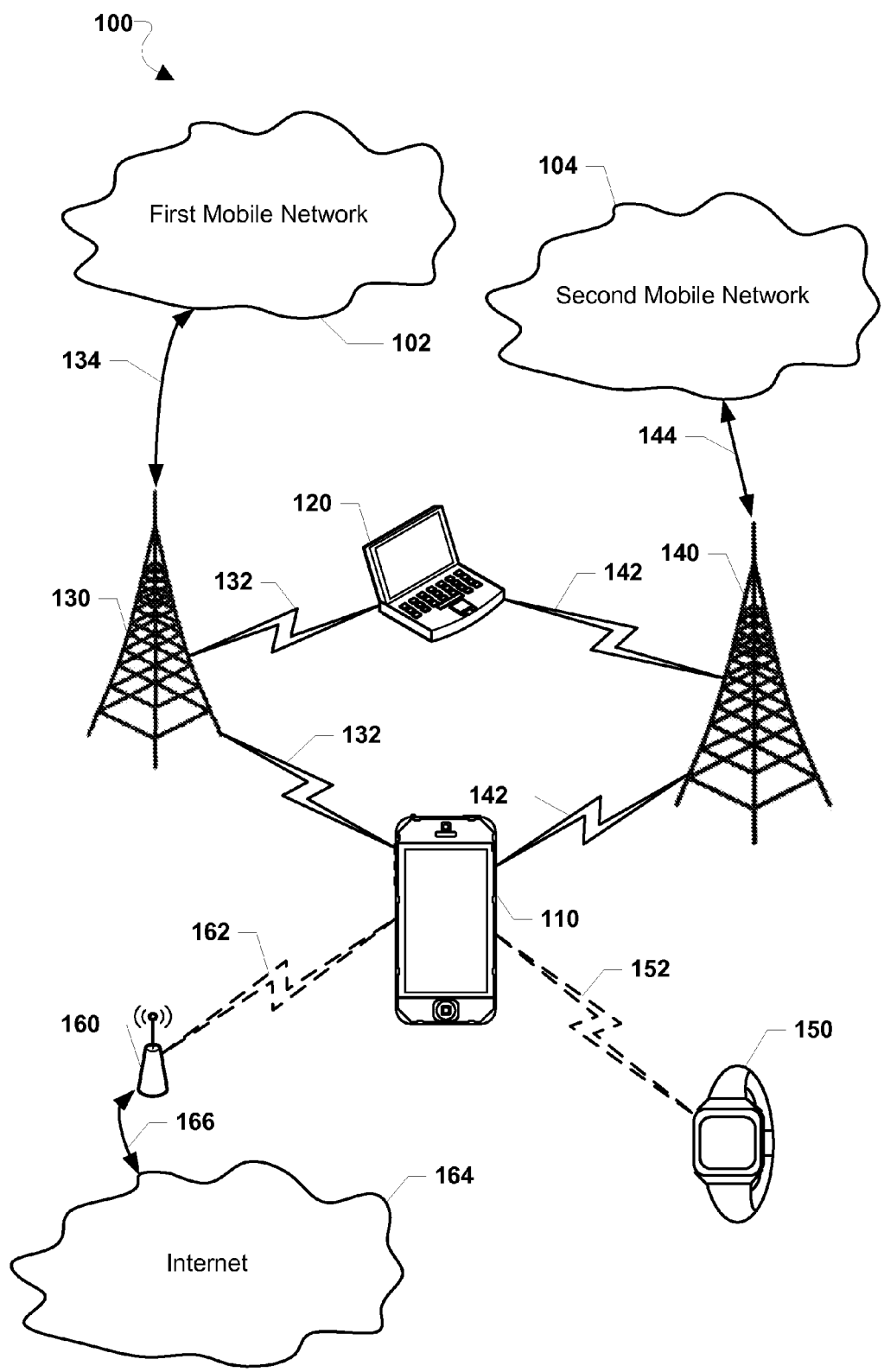
FIG. 1 is a communication system block diagram of mobile telephony networks suitable for use with various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the written description or the claims.

As used herein, the terms "mobile communication device," "multi-SIM mobile communication device" and "multi-SIM device" refer to any one or all of cellular telephones, smart phones, smart watches, personal or mobile multi-media players, personal data assistants, laptop computers, tablet computers, smart books, palm-top computers, wireless electronic mail receivers, multimedia Internet-enabled cellular telephones, wireless gaming controllers, and similar personal electronic devices that includes one or more SIM cards, a programmable processor, memory, and circuitry for connecting to at least two mobile communication network with one or more shared RF resources. Various embodiments may be useful in mobile communication devices, such as smart phones, and so such devices are referred to in the descriptions of various embodiments. However, the embodiments may be useful in any electronic devices that may individually maintain a plurality of RATs/subscriptions that utilize at least one shared RF chain, which may include one or more of antennae, radios, transceivers, etc. Multi-SIM mobile communication devices may be configured to operate in DSDS mode.

As used herein, the terms "SIM," "SIM card," and "subscriber identification module" are used interchangeably to refer to a memory that may be an integrated circuit such as an UICC or embedded into a removable card, and that stores an International Mobile Subscriber Identity (IMSI), related key, and/or other information used to identify and/or authenticate a multi-standby communication device on a network and enable a communication service with the network. Because the information stored in a SIM enables the multi-SIM mobile communication device to establish a communication link for a particular communication service with a particular network, the term "subscription" is used herein as a shorthand reference to refer to the communication service associated with and enabled by the information stored in a particular SIM as the SIM and the communication network, as well as the services and subscriptions supported by that network, correlate to one another.

The term "server" is used herein to refer to any of a variety of commercially available computer systems configured to operate in a client-server architecture. In particular, the term "server" refers to network servers, particularly Internet or Intranet accessible servers, which typically include a processor, memory (e.g., hard disk memory), and network interface circuitry configured to connect the server processor to the network, such as the Internet or a cellular telephone network.

In the following descriptions of various embodiments, references made to a first subscription and a second subscription are arbitrary and used merely for the purposes of describing the embodiments. The mobile communication device processor may assign any indicator, name or other designation to differentiate the subscriptions associated with one or more SIMs.

In a multi-SIM mobile communication device, two or more RATs may function on the same device. For example, a multi-SIM communication device may support both LTE and GSM technologies. The multi-SIM communication device may be configured as a dual-SIM dual-standby (DSDS) device, meaning that both RATs share one RF resource and only one RAT may be active at any one time, with the other RAT in the idle mode.

One or more SIMs in a mobile communication device may be configured to communicate with network operators that operate within the country where the mobile communication device is purchased or used. When a user of a mobile communication device takes the device to another country, the mobile communication device may utilize a local network operator in that country via a virtual SIM (VSIM). For example, the home network operator may have agreements with network operators in other countries to have the mobile communication device utilize those operators when the device is in roaming mode.

A mobile communication device may connect with a remote VSIM server using its physical SIM to request usage of a VSIM network. The remote VSIM server provides a SIM profile to the mobile communication device, which the device may use to configure a VSIM module stored in memory on the device. The SIM profile may configure the VSIM module to emulate a physical SIM that supports a subscription used to communicate with the VSIM network. The VSIM network authenticates that the mobile communication device is authorized to utilize the VSIM network. The authentication process includes the VSIM network sending an authentication request to the mobile communication device. The mobile communication device obtains a response to the authentication request from the remote VSIM server, and sends the response to the VSIM network.

In order to utilize a VSIM on a mobile communication device, a VSIM application or operating system on the mobile communication device first obtains a VSIM profile from a remote VSIM server. The mobile communication device may configure the VSIM module with the VSIM profile to emulate a VSIM subscription used to communicate with a VSIM network. The VSIM network sends an authentication request to the mobile communication device over the VSIM subscription. The mobile communication device then communicates with the remote VSIM server using the subscription associated with the physical SIM to obtain a response to the authentication request. The mobile communication device may send the authentication response to the VSIM network, which then allows the mobile communication device to utilize the VSIM network.

In a multi-SIM communication device, and particularly a DSDS device with two subscriptions sharing an RF resource, a first subscription (the VSIM subscription) communicates with the VSIM network to obtain the authentication request. In a DSDS device, the modem physical SIM subscriptions share the RF resource. Thus, the mobile communication device tunes away from the VSIM subscription to the physical SIM subscription to obtain the authentication response from the remote server. This means that the mobile communication device is not in communication with the VSIM network during the tune-away. The process implemented on a remote VSIM server to generate and send the authentication response may take a long time (depending on radio conditions, the round trip time between the mobile communication device and the remote server, and other factors) compared to many wireless network processes and communication sequences. While the second subscription sends the authentication request to the remote server and waits for an authentication response, the first subscription and the VSIM network are not connected.

However, the connection between the VSIM network and the VSIM subscription on the mobile communication device is subject to certain limits. For example, if the mobile communication device does not re-establish communication with the VSIM network within a certain time period (e.g., on the order of 5-10 seconds) while the mobile communication device is still in a tune-away to the subscription communicating with the remote server, the VSIM network may declare a radio link failure and terminate the connection with the mobile communication device. The authentication process may then fail, which would require the mobile communication device to restart the authentication process again. It may take a mobile communication device several tries to authenticate access with the VSIM network, and the process may take a long time. Thus in DSDS devices, the length of the tune-away may prevent successful authentication with a VSIM network implementing conventional protocol processes.

In overview, various embodiments provide methods implemented with a processor of a mobile communication device (e.g., a multi-SIM multi-standby mobile communication device) for performing remote authentication of a VSIM in the mobile communication device. A first subscription, the VSIM subscription, of the mobile communication device may receive an authentication request from a VSIM network. The mobile communication device may tune from the first subscription to a second subscription (the physical SIM) to send the authentication request to a remote server. The communication with the remote server may be conducted in the packet switched domain, or the circuit switched domain, for example by formatting the authentication request as a short message service (SMS) communication.

After sending the authentication request to the remote server, the mobile communication device may maintain a communication link between the first subscription and the VSIM network while waiting for an authentication response from the remote server. In some embodiments, the mobile communication device may remain tuned to the second subscription but periodically perform a tune-away to the first subscription to communicate network acknowledgements and other messaging that inform the first network that first subscription remains in touch with the network. In some embodiments, the mobile communication device may tune back to the first subscription and periodically perform a tune-away to the second subscription. Periodically performing tune-aways between the first subscription and the second subscription allows the mobile communication device to communicate with the VSIM network and prevent a network time out or radio link failure. Upon receipt of the authentication response from the remote VSIM server through the second subscription (either in the packet switched domain or the circuit switched domain), the mobile communication device may send the authentication response to the VSIM network through the first subscription.

In alternative embodiments, the first subscription—the VSIM subscription—of the mobile communication device may receive an authentication request from a VSIM network. The mobile communication device may tune from the first subscription to a second subscription (provisioned from a physical SIM) to send the authentication request to a remote server. After sending the authentication request to the remote server, the mobile communication device may remain tuned to the second subscription. The mobile communication device may restrict communications using the second subscription to only authentication communication. Such restrictions may clear bandwidth so that the authentication response may be obtained quickly, before the VSIM network times out the connection with the first subscription. Upon receipt of the authentication response from the remote server through the second subscription, the mobile communication device may send the authentication response to the VSIM network through the first subscription.

Additional embodiments provide methods for processing a VSIM authentication request on a server. The server may provide a mobile communication device with a circuit switched domain number that the mobile communication device may use to contact the server (e.g., using a SMS message). The server may receive an authentication request from a mobile communication device using the circuit switched domain number to contact the remote server, for example as an SMS message. The authentication request may be generated by a virtual SIM network to verify that the mobile communication device is authorized to connect to the virtual SIM network. The server may send an authentication response to the mobile communication device using the circuit switched domain name assigned to the mobile communication device (e.g., as a SMS message).

Various embodiments may be implemented within a variety of communication systems 100, such as at least two mobile telephony networks, an example of which is illustrated in FIG. 1. A first mobile network 102 and a second mobile network 104 typically each include a plurality of cellular base stations (e.g., a first base station 130 and a second base station 140). A first mobile communication device 110 may be in communication with the first mobile network 102 through a cellular connection 132 to the first base station 130. The first mobile communication device 110 may also be in communication with the second mobile network 104 through a cellular connection 142 to the second base station 140. The first base station 130 may be in communication with the first mobile network 102 over a wired connection 134. The second base station 140 may be in communication with the second mobile network 104 over a wired connection 144.

A second mobile communication device 120 may similarly communicate with the first mobile network 102 through the cellular connection 132 to the first base station 130. The second mobile communication device 120 may also communicate with the second mobile network 104 through the cellular connection 142 to the second base station 140. The cellular connections 132 and 142 may be made through two-way wireless communication links, such as Third Generation (G-3), Fourth Generation (G-4), Long Term Evolution (LTE), Time Division Multiple Access (TDMA), Code Division Multiple Access (CDMA), Wideband CDMA (WCDMA), Global System for Mobile (GSM), Universal Mobile Telecommunications Systems (UMTS), and other mobile telephony communication technologies.

While the mobile communication devices 110, 120 are shown connected to the first mobile network 102 and, optionally, to the second mobile network 104, in some embodiments (not shown), the mobile communication devices 110, 120 may include two or more subscriptions to two or more mobile networks and may connect to those subscriptions in a manner similar to those described herein.

In some embodiments, the first mobile communication device 110 may optionally establish a wireless connection 152 with a peripheral device 150 used in connection with the first mobile communication device 110. For example, the mobile communication device 110 may communicate over a Bluetooth® link with a Bluetooth-enabled personal computing device (e.g., a "smart watch"). In some embodiments, the first mobile communication device 110 may optionally establish a wireless connection 162 with a wireless access point 160, such as over a Wi-Fi connection. The wireless access point 160 may be configured to connect to the Internet 164 or another network over a wired connection 166.

While not illustrated, the second mobile communication device 120 may similarly be configured to connect with the peripheral device 150 and/or the wireless access point 160 over wireless links.

Figure 2:
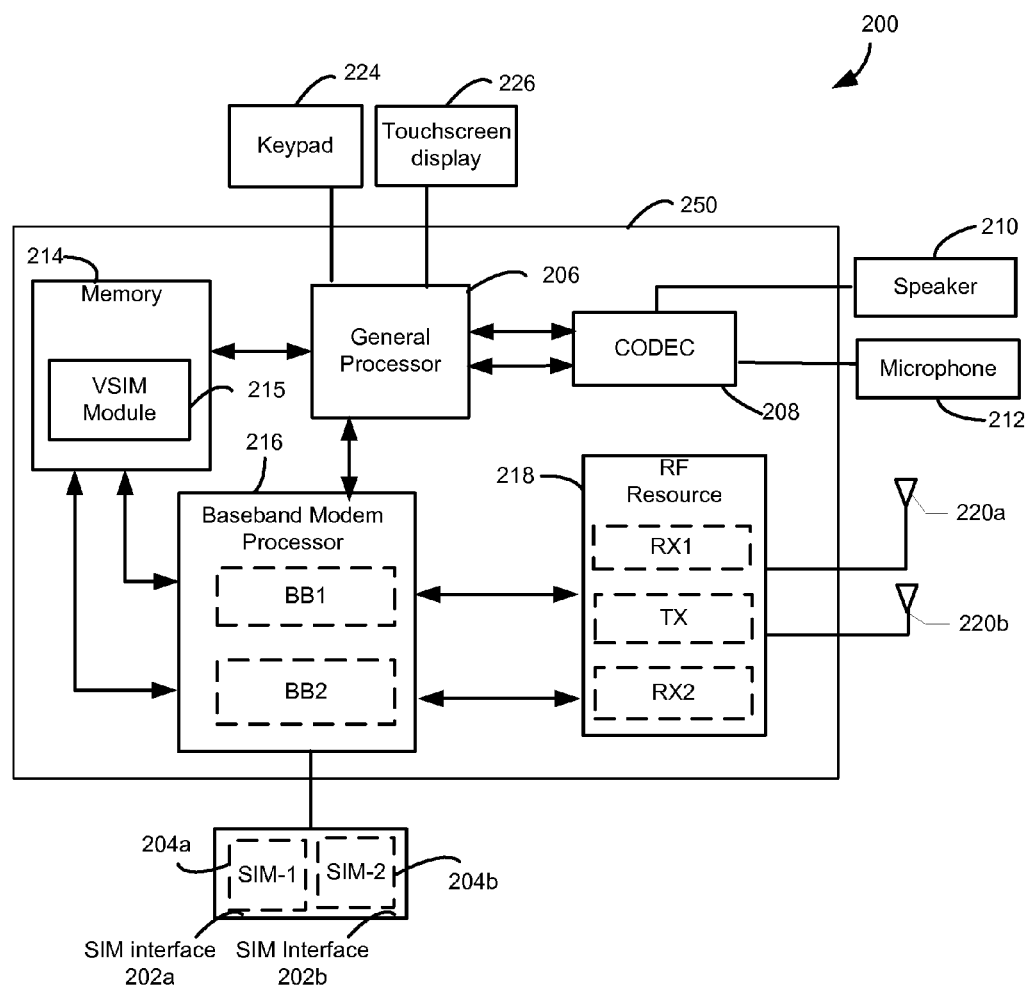
FIG. 2 is a component block diagram of a mobile communication device according to various embodiments.

FIG. 2 is a functional block diagram of a mobile communication device 200 suitable for implementing various embodiments. With reference to FIGS. 1-2, the mobile communication device 200 may be similar to one or more of the mobile communication devices 110, 120 as described. The mobile communication device 200 may include a first SIM interface 202a, which may receive a first identity module SIM-1 204a that is associated with a first subscription. The mobile communication device 200 may also optionally include a second SIM interface 202b, which may receive an optional second identity module SIM-2 204b that is associated with a second subscription.

A SIM in various embodiments may be a Universal Integrated Circuit Card (UICC) that is configured with SIM and/or Universal SIM applications, enabling access to, for example, GSM and/or UMTS networks. The UICC may also provide storage for a phone book and other applications. Alternatively, in a CDMA network, a SIM may be a UICC removable user identity module (R-UIM), an embedded UICC, or a CDMA subscriber identity module (CSIM) on a card. A SIM card may have a processor, read only memory, random access memory, programmable memory and input/output circuits.

A SIM used in various embodiments may contain user account information, an international mobile subscriber identity (IMSI), a set of SIM application toolkit (SAT) commands, and storage space for phone book contacts. A SIM card may further store home identifiers (e.g., a System Identification Number (SID)/Network Identification Number (NID) pair, a Home PLMN (HPLMN) code, etc.) to indicate the SIM card network operator provider. An Integrated Circuit Card Identity (ICCID) SIM serial number may be printed on the SIM card for identification. However, a SIM may be implemented within a portion of memory of the mobile communication device 200 (e.g., in a memory 214), and thus need not be a separate or removable circuit, chip or card.

The mobile communication device 200 may include at least one controller, such as a general processor 206, which may be coupled to a coder/decoder (CODEC) 208. The CODEC 208 may in turn be coupled to a speaker 210 and a microphone 212. The general processor 206 may also be coupled to the memory 214. The memory 214 may be a non-transitory computer-readable storage medium that stores processor-executable instructions. For example, the instructions may include routing communication data relating to the first or second subscription though a corresponding baseband-RF resource chain. The memory 214 may store an operating system (OS), as well as user application software and executable instructions, such as a VSIM module 215 that emulates the functionality of a physical SIM card. When the VSIM module 215 is loaded with a SIM profile provided by a remote VSIM server, the VSIM module 215 may support a VSIM subscription to connect with a VSIM network, such as a local network operator in a foreign country. The memory 214 may also store application data.

The general processor 206 and the memory 214 may each be coupled to at least one baseband modem processor 216. Each SIM and/or RAT in the mobile communication device 200 (e.g., the SIM-1 204a and/or the SIM-2 204b) may be associated with a baseband-RF resource chain. A baseband-RF resource chain may include the baseband modem processor 216, which may perform baseband/modem functions for communications with/controlling a RAT, and may include one or more amplifiers and radios, referred to generally herein as RF resources (e.g., RF resource 218). In some embodiments, baseband-RF resource chains may share the baseband modem processor 216 (i.e., a single device that performs baseband/modem functions for all RATs on the mobile communication device 200). In other embodiments, each baseband-RF resource chain may include physically or logically separate baseband processors (e.g., BB1, BB2).

The RF resource 218 may be a transceiver that performs transmit/receive functions for each of the SIMs/RATs on the mobile communication device 200. The RF resource 218 may include separate transmit and receive circuitry, or may include a transceiver that combines transmitter and receiver functions. In some embodiments, the RF resource 218 may include multiple receive circuitries. The RF resource 218 may be coupled to one or more wireless antennas (e.g., wireless antennas 220a and 220b). The RF resource 218 may also be coupled to the baseband modem processor 216.

In some embodiments, the general processor 206, the memory 214, the baseband processor(s) 216, and the RF resource 218 may be included in the mobile communication device 200 as a system-on-chip 250. In some embodiments, the first and second SIMs 204a, 204b and the corresponding interfaces 202a, 202b to each subscription may be external to the system-on-chip 250. Further, various input and output devices may be coupled to components on the system-on-chip 250, such as interfaces or controllers. Example user input components suitable for use in the mobile communication device 200 may include, but are not limited to, a keypad 224, a touchscreen display 226, and the microphone 212.

In some embodiments, the keypad 224, the touchscreen display 226, the microphone 212, or a combination thereof, may perform the function of receiving a request to initiate an outgoing call. For example, the touchscreen display 226 may receive a selection of a contact from a contact list or receive a telephone number. In another example, either or both of the touchscreen display 226 and the microphone 212 may perform the function of receiving a request to initiate an outgoing call. For example, the touchscreen display 226 may receive selection of a contact from a contact list or receive a telephone number. As another example, the request to initiate the outgoing call may be in the form of a voice command received via the microphone 212. Interfaces may be provided between the various software modules and functions in the mobile communication device 200 to enable communication between them, as is known in the art.

Functioning together, the two SIMs 204a, 204b, the baseband processor BB1, BB2, the RF resource 218 and the wireless antennas 220a, 220b may constitute two or more radio access technologies (RATs). For example, the mobile communication device 200 may be a communication device that includes a SIM, baseband processor, and RF resource configured to support two different RATs, such as LTE, CDMA, WCDMA, GSM, and UMTS. More RATs may be supported on the mobile communication device 200 by adding more SIM cards, SIM interfaces, RF resources, and antennae for connecting to additional mobile networks.

In some embodiments (not shown), the mobile communication device 200 may include, among other things, additional SIM cards, SIM interfaces, a plurality of RF resources associated with the additional SIM cards, and additional antennae for supporting subscriptions communications with additional mobile networks.

A VSIM application ("VSIM app") may be implemented as processor-executable instruction executing on the general processor 206, such as a process within the operating system, to perform operations of methods of various embodiments. In some embodiments, a VSIM controller may be implemented as processor-executable instructions executing on a modem processor, such as a baseband processor BB1, BB2, to perform some operations at the modem level.

Figure 3:
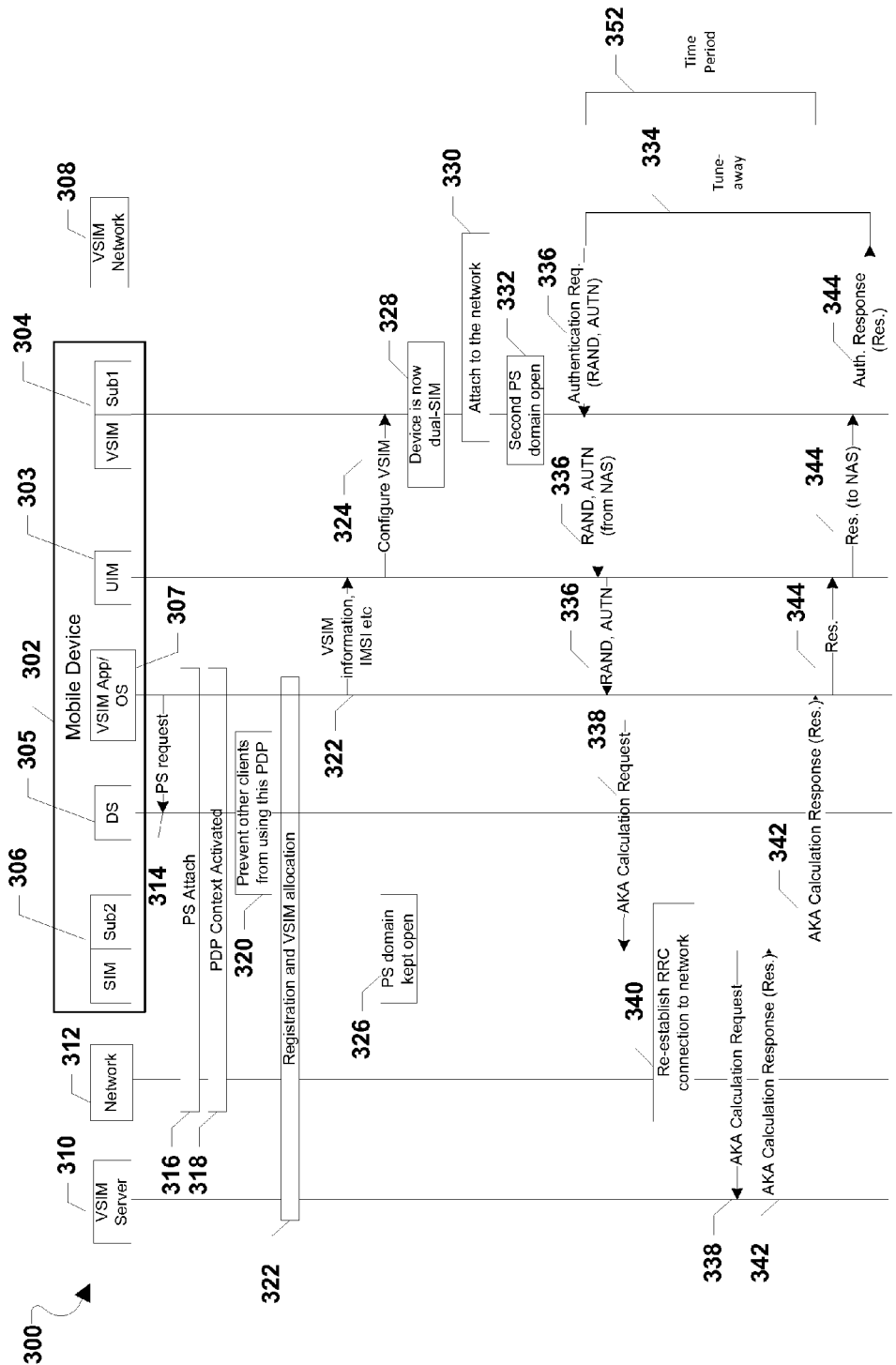
FIG. 3 is a call flow diagram illustrating the authentication process between a VSIM network, a mobile communication device, and a remote server.

FIG. 3 illustrates message flows 300 for a conventional authentication process between a mobile communication device 302, a VSIM network 308, and a remote VSIM server 310. With reference to FIGS. 1-3, the mobile communication device 302 includes a first subscription 304, which may be associated with a virtual SIM configured to communicate with the VSIM network 308 through a RAT, such as LTE or WCDMA. The mobile communication device 302 may include a user identity module (UIM) 303 that interfaces between the modem and the first subscription 304. The mobile communication device 302 includes a second subscription 306, which may be associated with a physical SIM configured to communicate with the remote server 310 through another network 312 using a RAT, for example GSM, GSM EDGE Radio Access Network (GERAN), or CDMA. The mobile communication device 302 may be configured as a DSDS device in that the mobile communication device 302 may have a single RF resource shared between the first subscription 304 and the second subscription 306.

Software 307 executing on the mobile communication device 302, such as a VSIM application or the operating system, may initiate a packet switched connection with the remote server 310 through the second subscription 306 by sending a packet-switched communication request 314 through a data service layer 305 of the modem. The data service layer 305 of the modem in the mobile communication device 302 may facilitate the communication between the second subscription 306 and the remote server 310. For example, the data service layer 305 may facilitate a packet-switched attachment 316 between the software 307 and the network 312, activate a specific packet data protocol (PDP) context in operation 318, and prevent other clients from using the activated PDP context in operation 320.

The remote server 310 may provide VSIM registration and allocation information 322 to the software 307 on the mobile communication device 302, which may include a SIM profile for the first subscription 304 of the mobile communication device 302, and a temporary identifier (e.g., an international mobile subscriber identity (IMSI)). The VSIM registration information 322 may be passed to the UIM 303, which may use the VSIM registration information 322 to configure a VSIM module on the mobile communication device 302 to implement the first subscription 304 to communicate with the VSIM network 308, in operation 324. For example, the UIM 303 of the modem in the mobile communication device 302 may be used to configure the VSIM module according to the SIM profile in the VSIM registration information 322.

After the operation 324, the mobile communication device 302 is now in a dual-SIM configuration 328 (i.e., both the first subscription 304 and the second subscription 306 are set up for communication). The packet-switched domain attachment between the second subscription 306 and the network 312 is kept open during the VSIM setup process in operation 326.

The first subscription 304 may attach to the VSIM network 308 in operation 330, which opens another packet-switched domain between the first subscription 304 and the VSIM network 308 in operation 332. The VSIM network 308 may send an authentication request 336 to the mobile communication device 302 through the first subscription 304. The authentication request 336 may originate from a mobile management entity, radio network controller, or serving general packet radio service (GPRS) support node of the VSIM network 308, and be communicated to the mobile communication device 302 through a base station of the VSIM network 308.

The authentication request 336 may include an authentication token (AUTN) and a random number (RAND). An authentication response 344 may be generated from the authentication request 336 through a calculation utilizing the AUTN, RAND, and a root key stored by the remote server 310. The authentication request 336 may be passed from the first subscription 304 to the UIM 303, and further on to the software 307. The software 307 may format the authentication request 336 as an authentication and key agreement (AKA) calculation request 338 to be sent to the remote server 310.

The mobile communication device 302 may perform a tune-away 334 from the first subscription 304 to the second subscription 306. The second subscription 306 may reestablish a radio resource control (RRC) connection to the network 312 in operation 340. The second subscription 306 may send the AKA calculation request 338 to the remote server 310 through the network 312. The tune-away 334 persists until the second subscription 306 receives the AKA calculation response 342 from the remote server 310. During the tune-away 334 the mobile communication device 302 and the VSIM network 308 are not in communication. The remote server 310 generates the AKA calculation response 342 and sends the AKA calculation response 342 to the software 307 of the mobile communication device 302 through the second subscription 306. The software 307 may generate an authentication response 344 from the AKA calculation response 342 and pass the authentication response 344 to the first subscription 304 through the UIM 303. The first subscription 304 may send the authentication response 344 to the VSIM network 308.

The VSIM network 308 may monitor communications with the mobile communication device 302, and may declare a radio link failure or another time-out condition if the VSIM network 308 has not received any communication from the mobile communication device 302 after some time period 352. The time period 352 may be defined by a timer in the VSIM network 308, or by certain communication quality measures, or by other factors. As illustrated in FIG. 3, the time period 352 expires before the tune-away 334 ends, and so the VSIM network 308 declares the radio link failure before the mobile communication device 302 obtains the AKA calculation response 342 from the remote server 310. This means the mobile communication device 302 has to restart the whole authentication process again, which may take a long time. Also, poor radio conditions may lead to the authentication process failing several times because the process cannot be completed within the time period 352.

Figure 4:
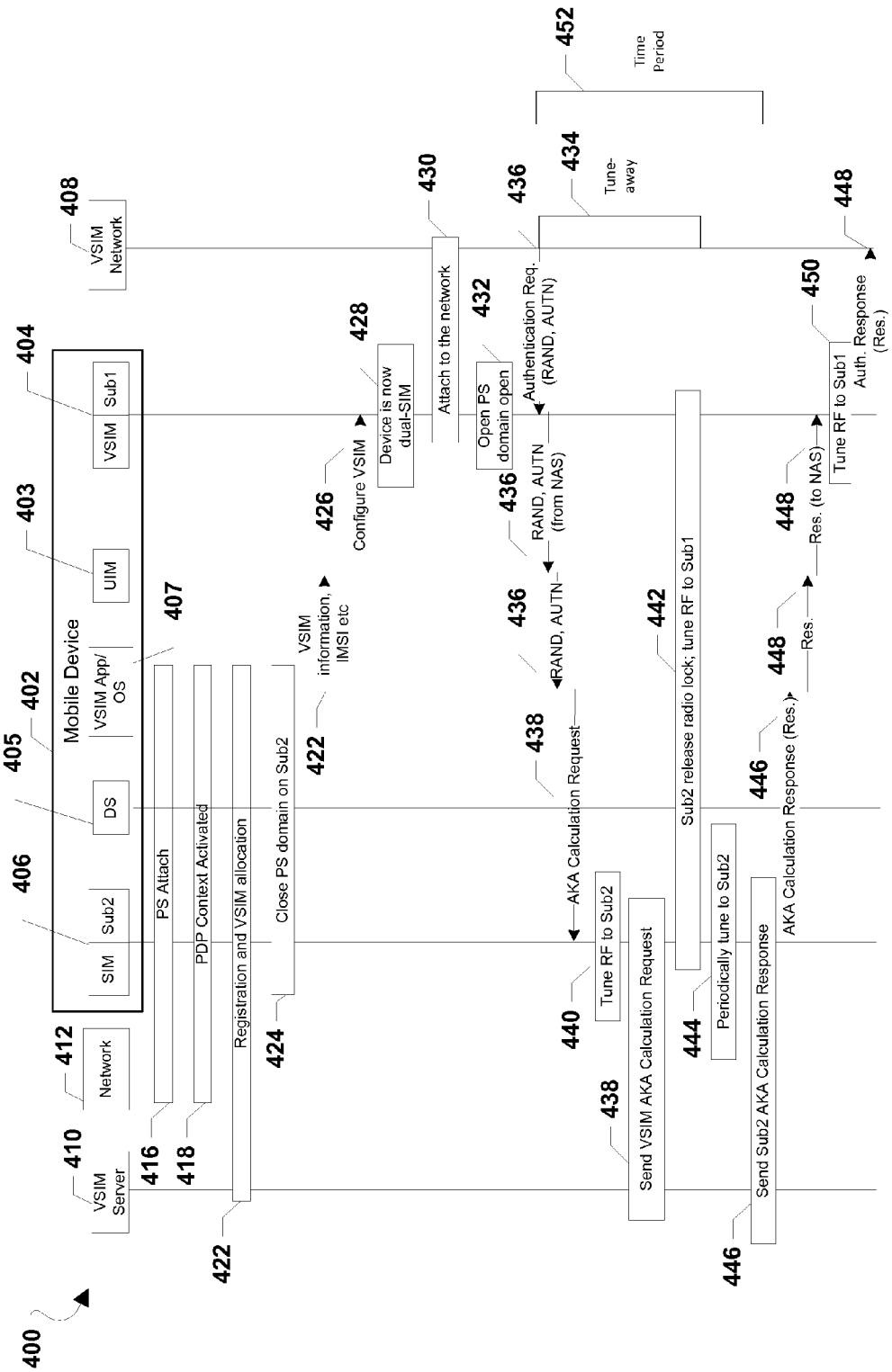
FIG. 4 is a call flow diagram illustrating an authentication process between a VSIM network, a mobile communication device, and a remote server according to various embodiments.

The systems and methods described herein are aimed at preventing a VSIM radio link failure or other time-out conditions and thus ensuring a higher rate of success in the authentication process. FIG. 4 illustrates call flows 400 for an authentication process between a mobile communication device 402, a VSIM network 408, and a remote VSIM server 410.

With reference to FIGS. 1-4, the mobile communication device 402 includes a first subscription 404, which may be associated with a virtual SIM configured to communicate with the VSIM network 408 through a RAT, such as LTE or WCDMA. The mobile communication device 402 may include a UIM 403 that interfaces between the modem and the first subscription 404. The mobile communication device 402 includes a second subscription 406, which may be associated with a physical SIM configured to communicate with the remote server 410 through another network 412 using a RAT, for example GSM, GERAN, or CDMA. The mobile communication device 402 may be configured as a DSDS device in that the mobile communication device 402 may have a single RF resource shared between the first subscription 404 and the second subscription 406.

Software 407 executing on the mobile communication device 402, such as a VSIM application or the operating system, may initiate a packet switched connection with the remote server 410 through the second subscription 406 by sending a packet-switched communication request through a data service layer 405 of the modem. The remote server 410 may be configured to send and receive both packet switched domain communications and circuit switched domain communications, such as SMS messages. The data service layer 405 of the modem in the mobile communication device 402 may facilitate the communication between the second subscription 406 and the remote server 410. For example, the data service layer 405 may facilitate a packet-switched attachment 416 between the software 407 and the network 412 and activate a specific PDP context in operation 418.

The remote server 410 may provide VSIM registration and allocation information 422 to the software 407 on the mobile communication device 402, which may include a SIM profile for the first subscription 404 of the mobile communication device 402, and a temporary identifier (e.g., an IMSI). The VSIM registration information 422 may also include a circuit switched domain number, such as a mobile station international subscriber directory number (MSISDN), that the mobile communication device 402 may use to communicate with the remote server 410 in the circuit switched domain. The VSIM registration information 422 may be passed to the UIM 403, which may use the VSIM registration information 422 to configure a VSIM module on the mobile communication device 402 to implement the first subscription 404 to communicate with the VSIM network 408 in operation 426. For example, the UIM 403 of the modem in the mobile communication device 402 may be used to configure the VSIM module according to the SIM profile in the VSIM registration information 422.

After the operation 426, the mobile communication device 402 is now in a dual-SIM configuration 428 (i.e., both the first subscription 404 and the second subscription 406 are set up for communication). The packet-switched domain attachment between the second subscription 406 and the network 412 may be closed after obtaining the VSIM registration information 422 in operation 424.

The first subscription 404 may attach to the VSIM network 408 in operation 430, which opens a packet-switched domain between the first subscription 404 and the VSIM network 408 in operation 432. The VSIM network 408 may send an authentication request 436 to the mobile communication device 402 through the first subscription 404. The authentication request 436 may originate from a mobile management entity, radio network controller, or serving GPRS support node of the VSIM network 408, and is communicated to the mobile communication device 402 through a base station of the VSIM network 408.

The authentication request 436 may include an authentication token (AUTN) and a random number (RAND). An authentication response 448 may be generated from the authentication request 436 through a calculation utilizing the AUTN, RAND, and a root key stored by the remote server 410. The authentication request 436 may be passed from the first subscription 404 to the UIM 403, and further on to the software 407. The software 407 may format the authentication request 436 as an AKA calculation request 438 to send to the remote server 410.

The mobile communication device 402 may perform a tune-away 434 from the first subscription 404 to the second subscription 406 by tuning the RF resource to the second subscription 406 in operation 440. The second subscription 406 may send the AKA calculation request 438 to the remote server 410 through the network 412. The second subscription 406 may format the AKA calculation request 438. For example, the second subscription 406 may communicate with the remote server 410 in the packet switched domain, in which case the AKA calculation request 438 may be in a packet format (i.e., a data packet). Alternatively, the second subscription 406 may also communicate with the remote server 410 in the circuit switched domain, in which case the AKA calculation request 438 may be formatted as a SMS message. The second subscription 406 may then utilize the MSISDN received from the remote server 410 to communicate with the remote server 410 in the circuit switched domain.

Unlike the call flows 300, after the second subscription 406 sends the AKA calculation request 438 to the remote server 410, the mobile communication device 402 tunes back to the first subscription 404 in operation 442, rather than remaining tuned to the second subscription 406 and waiting for the AKA calculation response 446. This allows the first subscription 404 to communicate with the VSIM network 408, thus avoiding any radio link failure or other network time-out condition that may occur when there is no communication between the mobile communication device 402 and the VSIM network 408 within a time period 452.

The mobile communication device 402 may periodically perform tune-aways 444 from the first subscription 404 to the second subscription 406 to check whether the remote server 410 has sent an AKA calculation response 446. Every time a tune-away ends and the first subscription 404 regains control of the shared RF resource, the first subscription 404 may communicate with the VSIM network 408 to remain in synch with the VSIM network 408. Data sent by the mobile communication device 402 to the VSIM network 408 may include meaningless or fake uplink data because the main purpose of the communication is not to send actual information, but to remain in synch with the VSIM network 408. In this manner, any delays in receiving the AKA calculation response 446 from the remote server 410 does not result in a network time out or radio link failure.

Once the remote server 410 has calculated the AKA calculation response 446, the remote server 410 may send the AKA calculation response 446 to the mobile communication device 402 through the second subscription 406. The format of the AKA calculation response 446 may be an SMS message in the circuit switched domain or a data packet in the packet switched domain. The format of the AKA calculation response 446 may be the same format as the format of the AKA calculation request 438 received by the remote server 410. The software 407 may generate the authentication response 448 from the AKA calculation response 446 and pass the authentication response 448 to the first subscription 404 through the UIM 403. The mobile communication device 402 may then tune from the second subscription 406 to the first subscription 404 in operation 450 and send the authentication response 448 to the VSIM network 408 through the first subscription 404 in a format recognizable by the VSIM network 408 (e.g., a data packet in the packet switched domain).

Figure 5:
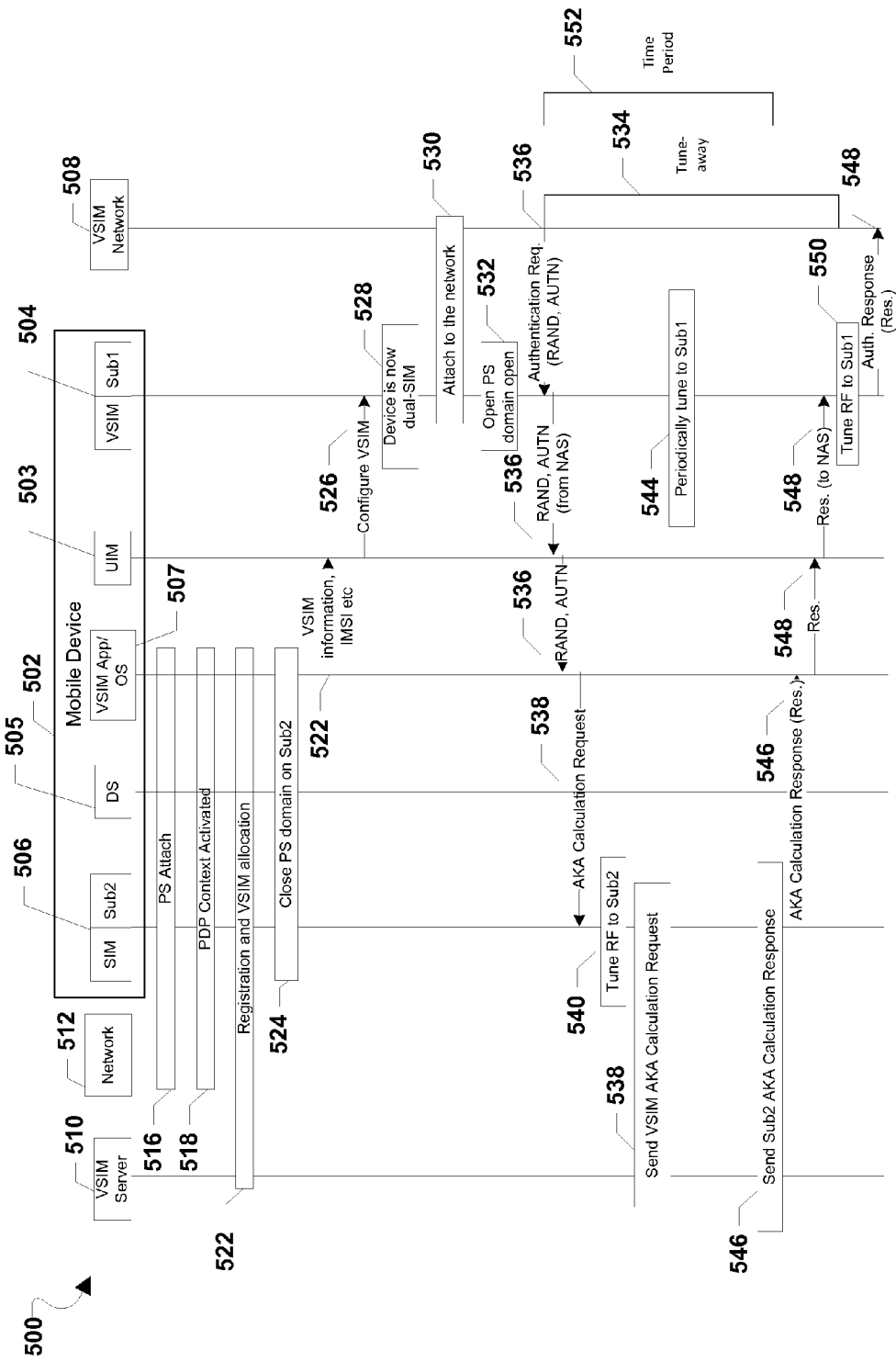
FIG. 5 is a call flow diagram illustrating another authentication process between a VSIM network, a mobile communication device, and a remote server according to various embodiments.

FIG. 5 illustrates call flows 500 for another authentication process between a mobile communication device 502, a VSIM network 508, and a remote VSIM server 510. With reference to FIGS. 1-5, the mobile communication device 502 includes a first subscription 504, which may be associated with a virtual SIM configured to communicate with the VSIM network 508 through a RAT, such as LTE or WCDMA. The mobile communication device 502 may include a UIM 503 that interfaces between the modem and the first subscription 504. The mobile communication device 502 includes a second subscription 506, which may be associated with a physical SIM configured to communicate with the remote server 510 through another network 512 using a RAT, for example GSM, GERAN, or CDMA. The mobile communication device 502 may be configured as a DSDS device in that the mobile communication device 502 may have a single RF resource shared between the first subscription 504 and the second subscription 506.

Software 507 executing on the mobile communication device 502, for example a VSIM application or the operating system, may initiate a packet switched connection with the remote server 510 through the second subscription 506 by sending a packet-switched communication request through a data service layer 505 of the modem. The remote server 510 may be configured to receive packet switched domain communications. The data service layer 505 of the modem in the mobile communication device 502 may facilitate the communication between the second subscription 506 and the remote server 510. For example, the data service layer 505 may facilitate a packet-switched attachment 516 between the software 507 and the network 512 and activate a specific PDP context in operation 518.

The remote server 510 may provide VSIM registration and allocation information 522 to the software 507 on the mobile communication device 502, which may include a SIM profile for the first subscription 504 of the mobile communication device 502, and a temporary identifier (e.g., an IMSI). The VSIM registration information 522 may be passed to the UIM 503, which may use the VSIM registration information 522 to configure the first subscription 504 to communicate with the VSIM network 508 in operation 526. For example, the UIM 503 of the modem in the mobile communication device 502 may be used to configure a VSIM module on the mobile communication device 502 to implement the first subscription 504 according to the SIM profile in the VSIM registration information 522.

After the operation 526 the mobile communication device 502 is in a dual-SIM configuration 528 (i.e., both the first subscription 504 and the second subscription 506 are set up for communication). The packet-switched domain attachment between the second subscription 506 and the network 512 may be closed after obtaining the VSIM registration information 522 in operation 524.

The first subscription 504 may then attach to the VSIM network 508 in operation 530, which opens a packet-switched domain between the first subscription 504 and the VSIM network 508 in operation 532. The VSIM network 508 may send an authentication request 536 to the mobile communication device 502 through the first subscription 504. The authentication request 536 may originate from a mobile management entity, radio network controller, or serving GPRS support node of the VSIM network 508, and is communicated to the mobile communication device 502 through a base station of the VSIM network 508.

The authentication request 536 may include an authentication token (AUTN) and a random number (RAND). An authentication response 548 may be generated from the authentication request 536 through a calculation utilizing the AUTN, RAND, and a root key stored by the remote server 510. The authentication request 536 may be passed from the first subscription 504 to the UIM 503, and further on to the software 507. The software 507 may format the authentication request 536 as an AKA calculation request 538 to send to the remote server 510.

The mobile communication device 502 may perform a tune-away 534 from the first subscription 504 to the second subscription 506 by tuning the RF resource to the second subscription 506 in operation 540. The second subscription 506 may send the AKA calculation request 538 to the remote server 510 through the network 512. After the second subscription 506 sends the AKA calculation request 538 the mobile communication device 502 may remained tuned to the second subscription 506.

The mobile communication device 502 may periodically perform tune-aways 544 from the second subscription 506 to the first subscription 504 (in effect, the opposite direction as the tune-aways 444 in FIG. 4). This allows the first subscription 504 to communicate with the VSIM network 508, thus avoiding any radio link failure or other network time-out condition that may occur when there is no communication between the mobile communication device 502 and the VSIM network 508 within a time period 552. Every time a tune-away 544 begins and the first subscription 504 regains control of the shared RF resource, the first subscription 504 may communicate with the VSIM network 508 to remain in synch with the VSIM network 508. Data sent by the mobile communication device 502 to the VSIM network 508 may include meaningless or fake uplink data because the main purpose of the communication is not to send actual information, but to remain in synch with the VSIM network 508. In this manner, any delays in receiving an AKA calculation response 546 from the remote server 510 does not result in a network time out or radio link failure.

Once the remote server 510 has calculated the AKA calculation response 546, the remote server 510 may send the AKA calculation response 546 to the mobile communication device 502 through the second subscription 506. The software 507 may generate the authentication response 548 from the AKA calculation response 546 and pass the authentication response 548 to the first subscription 504 through the UIM 503. The mobile communication device 502 may tune from the second subscription 506 to the first subscription 504 in operation 550, and send the authentication response 548 to the VSIM network 508 through the first subscription 504.

Figure 6:
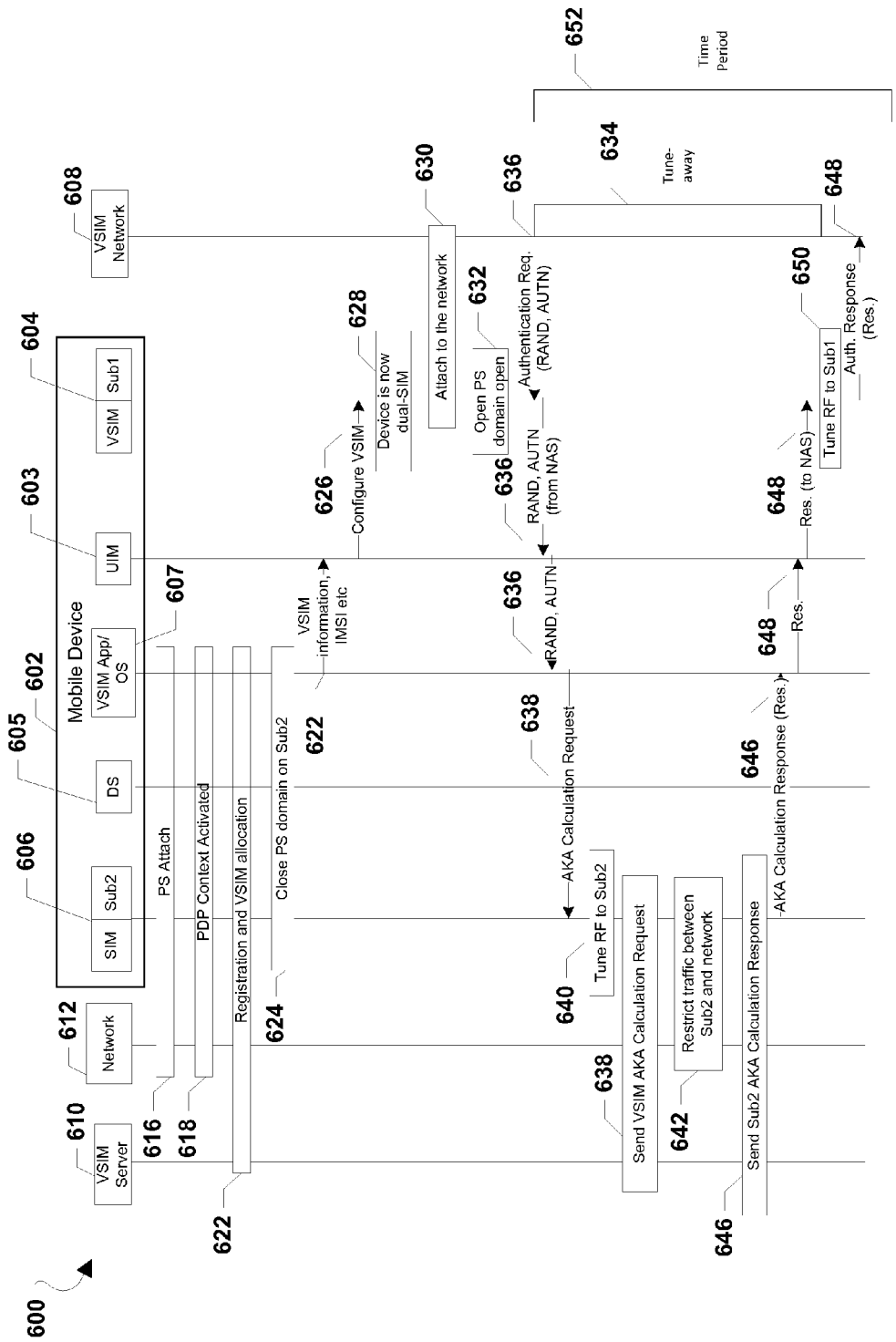
FIG. 6 is call flow diagram illustrating another authentication process between a VSIM network, a mobile communication device, and a remote server according to various embodiments.

FIG. 6 illustrates call flows 600 for another improved authentication process between a mobile communication device 602, a VSIM network 608, and a remote VSIM server 610. With reference to FIGS. 1-6, the mobile communication device 602 includes a first subscription 604, which may be associated with a virtual SIM configured to communicate with the VSIM network 608 through a RAT, such as LTE or WCDMA. The mobile communication device 602 may include a UIM 603 that interfaces between the modem and the first subscription 604. The mobile communication device 602 includes a second subscription 606, which may be associated with a physical SIM configured to communicate with the remote server 610 through another network 612 using RAT, for example GSM, GERAN, or CDMA. The mobile communication device 602 may be configured as a DSDS device in that the mobile communication device 602 may have a single RF resource shared between the first subscription 604 and the second subscription 606.

Software 607 executing on the mobile communication device 602, for example a VSIM application or the operating system, may initiate a packet switched connection with the remote server 610 through the second subscription 606 by sending a packet-switched communication request through a data service layer 605 of the modem. The remote server 610 may be configured to receive packet switched domain communications. The data service layer 605 of the modem in the mobile communication device 602 may facilitate the communication between the second subscription 606 and the remote server 610. For example, the data service layer 605 may facilitate a packet-switched attachment 616 between the software 607 and the network 612 and activate a specific PDP context in operation 618.

The remote server 610 may provide VSIM registration and allocation information 622 to the software 607 on the mobile communication device 602, which may include a SIM profile for the first subscription 604 of the mobile communication device 602, and a temporary identifier (e.g., an IMSI). The VSIM registration information 622 may be passed to the UIM 603, which may use the VSIM registration information 622 to configure the first subscription 604 to communicate with the VSIM network 608 in operation 626. For example, the UIM 503 of the modem in the mobile communication device 602 may be used to configure a VSIM module on the mobile communication device 602 to implement the first subscription 604 according to the SIM profile in the VSIM registration information 622.

After the operation 626, the mobile communication device 602 is in a dual-SIM configuration 628 (i.e., both the first subscription 604 and the second subscription 606 are set up for communication). The packet-switched domain attachment between the second subscription 606 and the network 612 may be closed after obtaining the VSIM registration information 622 in operation 624.

The first subscription 604 may attach to the VSIM network 608 in operation 630, which opens a packet-switched domain between the first subscription 604 and the VSIM network 608 in operation 632. The VSIM network 608 may send an authentication request 636 to the mobile communication device 602 through the first subscription 604. The authentication request 636 may originate from a mobile management entity, radio network controller, or serving GPRS support node of the VSIM network 608, and is communicated to the mobile communication device 602 through a base station of the VSIM network 608.

The authentication request 636 may include an authentication token (AUTN) and a random number (RAND). An authentication response 648 may be generated from the authentication request 636 through a calculation utilizing the AUTN, RAND, and a root key stored by the remote server 610. The authentication request 636 may be passed from the first subscription 604 to the UIM 603, and further on to the software 607. The software 607 may format the authentication request 636 as an AKA calculation request 438 to send to the remote server 610.

The mobile communication device 602 may perform a tune-away 634 from the first subscription 604 to the second subscription 606 by tuning the RF resource to the second subscription 606 in operation 640. The second subscription 606 may send the AKA calculation request 638 to the remote server 610 through the network 612. After the second subscription 606 sends the AKA calculation request 638, the mobile communication device 602 may remained tuned to the second subscription 606. The mobile communication device 602 may then issue instructions 642 to restrict traffic on the second subscription 606 to only authentication communication. This may increase the bandwidth available for the second subscription 606 to communicate with the remote server 610, which may result in receiving an AKA calculation response 646 faster.

The instructions 642 may be issued by the software 607 of the mobile communication device 602. The instructions 642 may include an instruction to set a flag in the data service layer 605 of the modem in the mobile communication device 602. This flag may indicate that only authentication communication between the second subscription 606 and the remote server 610 is permitted. In this manner, the instructions 642 are meant to allow the mobile communication device 602 to receive the AKA calculation response 646 from the remote server 610 before a time period 652 expires.

Once the remote server 610 has calculated the AKA calculation response 646, the remote server 610 may send the AKA calculation response 646 to the mobile communication device 602 through the second subscription 606. The software 607 may generate the authentication response 648 from the AKA calculation response 646 and pass the authentication response 648 to the first subscription 604 through the UIM 603. The mobile communication device 602 may then end the tune-away 634 and tune the RF resource to the first subscription in operation 650, and send the authentication response 648 to the VSIM network 608 through the first subscription 604.

Figure 7:
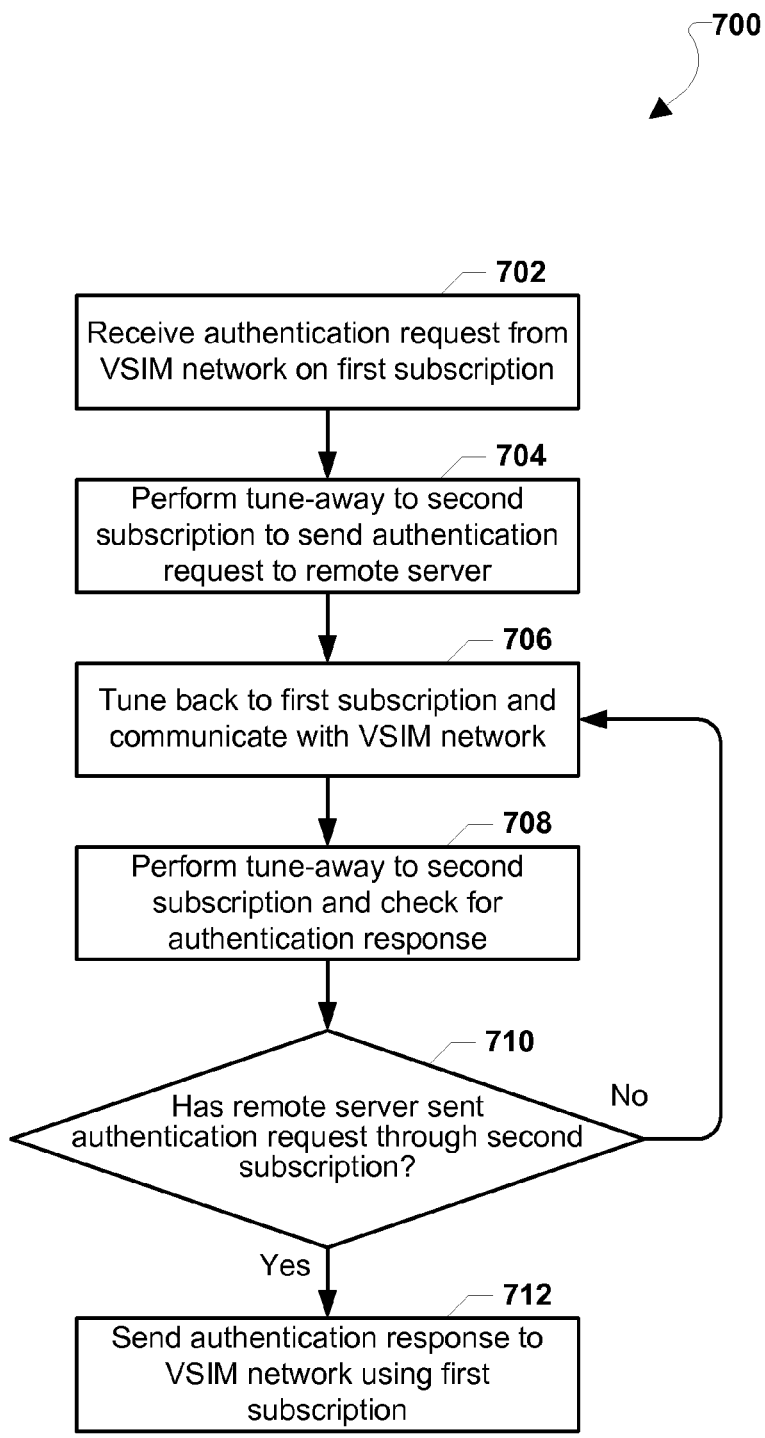
FIG. 7 is a process flow diagram illustrating a method for performing remote authentication of a VSIM on a mobile communication device according to various embodiments.

FIG. 7 illustrates a method 700 for performing remote authentication of a virtual SIM on a mobile communication device according to various embodiments. With reference to FIGS. 1-7, the method 700 may be implemented in processor-executable instructions executing on a processor (e.g., the general processor 206, the baseband modem processor 216, a separate controller, and/or the like) of a mobile communication device (such as the mobile communication devices 110, 120, 200, 402, 502, 602) that supports two or more subscriptions sharing a RF resource. For example, the mobile communication device may be a DSDS device with one subscription associated with a virtual SIM and another subscription associated with a physical SIM.

In block 702, the mobile communication device processor receives an authentication request from a VSIM network over a first subscription. Software on the mobile communication device, such as a VSIM application or the operating system, may have previously established a connection with a remote VSIM server using the second subscription and received VSIM registration information (e.g., a packet switched communication through a GSM or CDMA network with the remote server). The VSIM registration information configures a VSIM module on the mobile communication device to implement the first subscription to communicate with the VSIM network. The VSIM registration information may include a VSIM profile for the first subscription, a temporary identifier (e.g., an IMSI), and a circuit switched domain number, such as an MSISDN, to communicate with the remote server in the circuit switched domain. The first subscription uses the VSIM registration information to connect to the VSIM network, which may send the authentication request to the mobile communication device.

In block 704, the processor may perform a tune-away from the first subscription to the second subscription to send the authentication request to the remote server. The authentication request may include an authentication token (AUTN) and a random number (RAND) and the processor may convert the authentication request into an AKA calculation request to be sent to the remote server. The remote server may store a root key that allows the remote server to calculate an authentication response from the authentication request. The second subscription may communicate with the remote server in the circuit switched domain, for example by formatting the authentication request as a SMS message and communicating with the remote server using the MSISDN assigned by the remote server. Alternatively, the second subscription may communicate with the remote server in the packet switched domain, for example by formatting the authentication request as a data packet.

In block 706, the processor may tune back to the first subscription. This allows the mobile communication device to establish communication with the VSIM network and thus avoid any radio link failure or other network time-out condition that may occur when there is no communication between the mobile communication device and the VSIM network within a certain time period. The communication between the first subscription and the VSIM network may include meaningless or fake uplink data because the main purpose of the communication is not to send actual information, but to remain in synch with the VSIM network.

In block 708, the processor may perform a tune-away from the first subscription to the second subscription. In determination block 710, the processor may determine whether the remote server has sent an authentication response through the second subscription. In response to determining that the remote server has not sent an authentication response (i.e., determination block 710="No"), the processor may tune back to the first subscription in block 706. In other words, as long as the remote server has not sent the authentication response, the processor may remain tuned to the first subscription and periodically perform tune-aways to the second subscription in block 708 to check for the arrival of the authentication response in determination block 710.

In response to determining that the remote server has sent the authentication response (i.e., determination block 710="Yes"), the processor may send the authentication response to the VSIM network using the first subscription in block 712. The authentication response received from the remote server may be formatted as a SMS message or data packet, depending on whether the second subscription communicates with the remote server in the circuit switched or packet switched domain. The processor may convert the authentication response, as necessary, to send the authentication response to the VSIM network. For example, the processor may convert the authentication response from an SMS message format to a data packet format. The authentication response received from the remote server may be formatted as an AKA calculation response and the processor may convert the AKA calculation response into another format to generate the authentication response. Thereafter the mobile communication device may begin utilizing the VSIM network to acquire data service. In this manner, the method 700 provides a way to increase the success rate for authenticating a VSIM on a mobile communication device.

Figure 8:
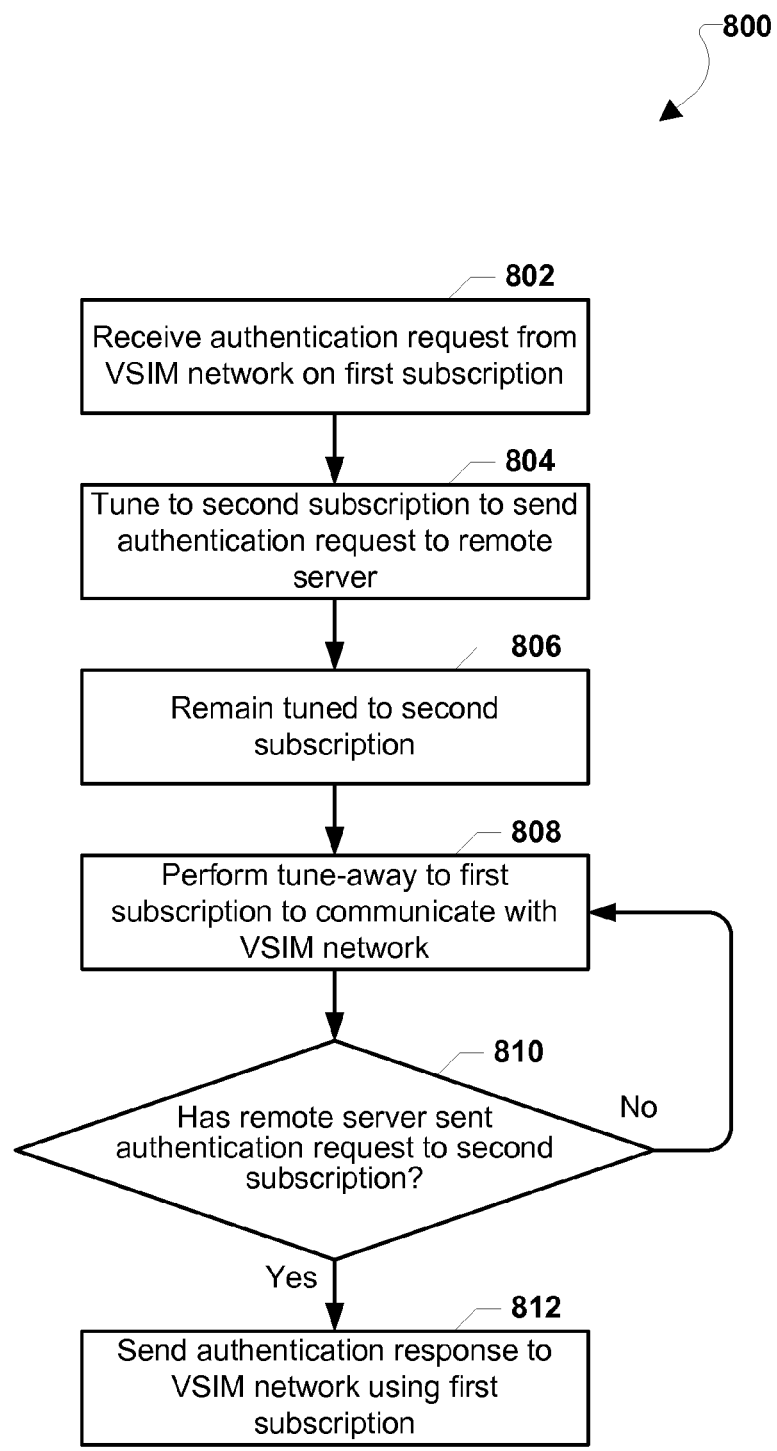
FIG. 8 is a process flow diagram illustrating another method for performing remote authentication of a VSIM on a mobile communication device according to various embodiments.

FIG. 8 illustrates a method 800 for performing remote authentication of a virtual SIM on a mobile communication device according to various embodiments. With reference to FIGS. 1-8, the method 800 may be implemented in processor-executable instructions executing on a processor (e.g., the general processor 206, the baseband modem processor 216, a separate controller, and/or the like) of a mobile communication device (such as the mobile communication devices 110, 120, 200, 402, 502, 602) that supports two or more subscriptions sharing a RF resource. For example, the mobile communication device may be a DSDS device with one subscription associated with a virtual SIM and another subscription associated with a physical SIM.

In block 802, the mobile communication device processor receives an authentication request from a VSIM network over a first subscription. Software on the mobile communication device, such as a VSIM application or the operating system, may have previously established a connection with a remote VSIM server using the second subscription and received VSIM registration information (e.g., a packet switched communication through a GSM or CDMA network with the remote server). The VSIM registration information configures a VSIM module on the mobile communication device to implement the first subscription to communicate with the VSIM network. The VSIM registration information may include a VSIM profile for the first subscription and a temporary identifier (e.g., an IMSI). The first subscription uses the VSIM registration information to connect to the VSIM network, which may send the authentication request to the mobile communication device.

In block 804, the processor may tune from the first subscription to the second subscription to send the authentication request to the remote server. The authentication request may include an authentication token (AUTN) and a random number (RAND) and the processor may convert the authentication request into an AKA calculation request to be sent to the remote server. The remote server may store a root key that allows the remote server to calculate an authentication response from the authentication request. The second subscription may communicate with the remote server in the packet switched domain, for example by formatting the authentication request as a data packet.

In block 806, the processor may remain tuned to the second subscription. In block 808, the processor may perform a tune-away from the second subscription to the first subscription. This allows the mobile communication device to establish communication with the VSIM network with the first subscription and thus avoid any radio link failure or other network time-out condition that may occur when there is no communication between the mobile communication device and the VSIM network within a certain time period. The communication between the first subscription and the VSIM network may include meaningless or fake uplink data because the main purpose of the communication is not to send actual information, but to remain in synch with the VSIM network.

In determination block 810, the processor may tune back to the second subscription and determine whether the remote server has sent an authentication response through the second subscription. In response to determining that the remote server has not sent an authentication response (i.e., determination block 810="No"), the processor may periodically (e.g., after a predefined delay) perform another tune-away to the first subscription (block 808) and then determine again whether the remote server has sent an authentication response in determination block 810. In other words, as long as the remote server has not sent the authentication response, the processor may periodically perform tune-aways to the first subscription to remain in synch with the VSIM network as the processor waits for the arrival of the authentication request from the remote server through the second subscription.

In response to determining that the remote server has sent the authentication response (i.e., determination block 810="Yes"), the processor may send the authentication response to the VSIM network using the first subscription in block 812. The authentication response received from the remote server may be formatted as an AKA calculation response and the processor may convert the AKA calculation response into another format to generate the authentication response. Thereafter mobile communication device may begin utilizing the VSIM network to acquire data service. In this manner, the method 800 provides a way to increase the success rate for authenticating a VSIM on a mobile communication device.

Figure 9:
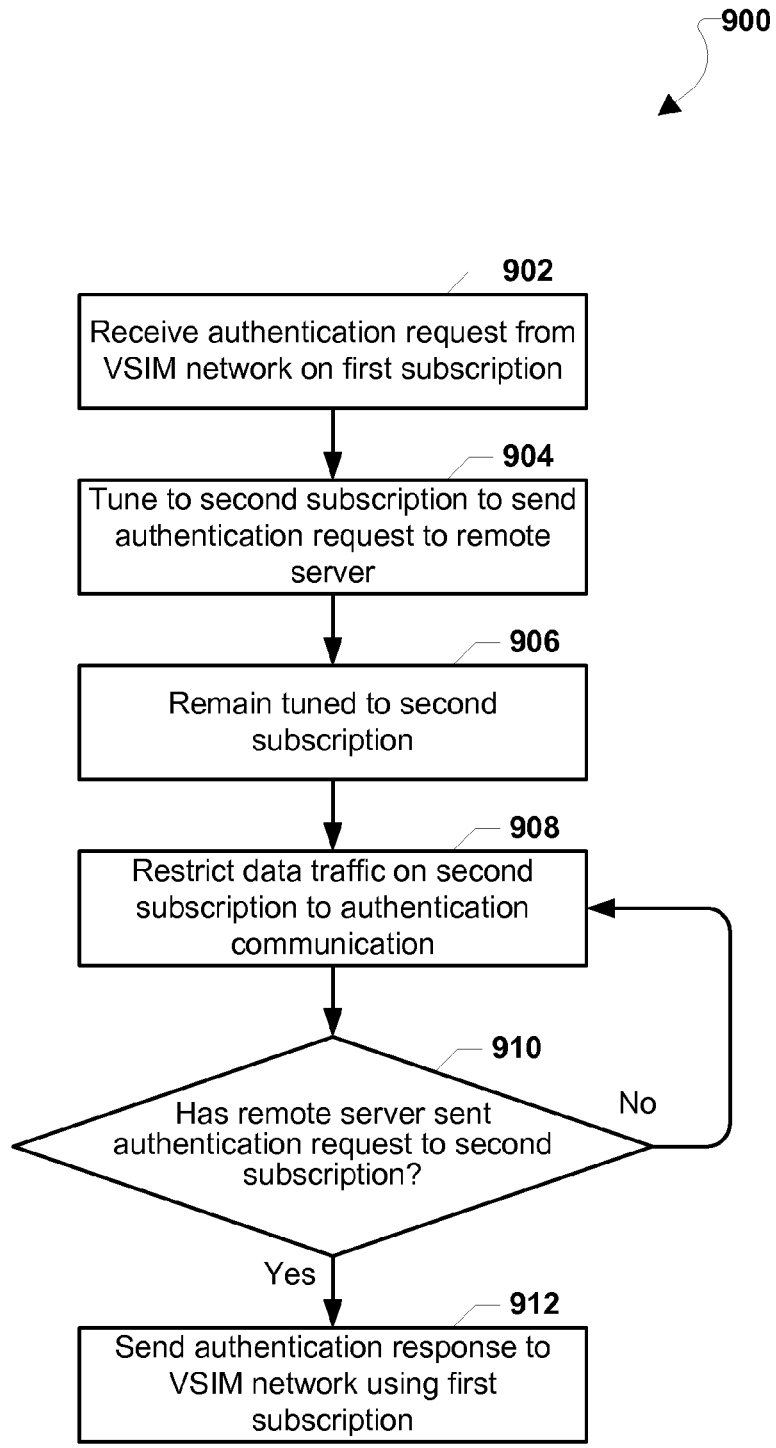
FIG. 9 is a process flow diagram illustrating another method for performing remote authentication of a VSIM on a mobile communication device according to various embodiments.

FIG. 9 illustrates a method 900 for performing remote authentication of a virtual SIM on a mobile communication device according to various embodiments. With reference to FIGS. 1-9, the method 900 may be implemented in processor-executable instructions executing on a processor (e.g., the general processor 206, the baseband modem processor 216, a separate controller, and/or the like) of a mobile communication device (such as the mobile communication devices 110, 120, 200, 402, 502, 602) that supports two or more subscriptions sharing a RF resource. For example, the mobile communication device may be a DSDS device with one subscription associated with a virtual SIM and another subscription associated with a physical SIM.

In block 902, the mobile communication device processor receives an authentication request from a VSIM network over a first subscription. Software on the mobile communication device, such as a VSIM application or the operating system, may have previously established a connection with a remote VSIM server using the second subscription and received VSIM registration information (e.g., a packet switched communication through a GSM or CDMA network with the remote server). The VSIM registration information configures a VSIM module on the mobile communication device to implement the first subscription to communicate with the VSIM network. The VSIM registration information may include a VSIM profile for the first subscription and a temporary identifier (e.g., an IMSI). The first subscription uses the VSIM registration information to connect to the VSIM network, which may send the authentication request to the mobile communication device.

In block 904, the processor may tune from the first subscription to the second subscription to send the authentication request to the remote server. The authentication request may include an authentication token (AUTN) and a random number (RAND) and the processor may convert the authentication request into an AKA calculation request to be sent to the remote server. The remote server may store a root key that allows the remote server to calculate an authentication response from the authentication request. The second subscription may communicate with the remote server in the packet switched domain, for example by formatting the authentication request as a data packet.

In block 906, the processor may remain tuned to the second subscription. In block 908, the processor may restrict data traffic on the second subscription to authentication communication. For example, the operating system of the mobile communication device may send an instruction to the processor to set a flag in the modem. The flag indicates that only authentication communication between the second subscription and the remote server is permitted. This allows the mobile communication device to free up device bandwidth so that the authentication response may be quickly received and thus avoid any radio link failure or other network time-out condition that may occur within a certain time period.

In determination block 910, the processor may determine whether the remote server has sent an authentication response through the second subscription. In response to determining that the remote server has not sent an authentication response (i.e., determination block 910="No"), the processor may continue to restrict data traffic on the second subscription in block 908 and periodically (e.g., after a predetermined delay) determine whether the remote server has sent an authentication response through the second subscription in determination block 910.

In response to determining that the remote server has sent the authentication response (i.e., determination block 910="Yes"), the processor may send the authentication response to the VSIM network using the first subscription in block 912. The authentication response received from the remote server may be formatted as an AKA calculation response and the processor may convert the AKA calculation response into another format to generate the authentication response. Thereafter the mobile communication device may begin utilizing the VSIM network to acquire data service. In this manner, the method 900 provides a way to increase the success rate for authenticating a VSIM on a mobile communication device.

Figure 10:
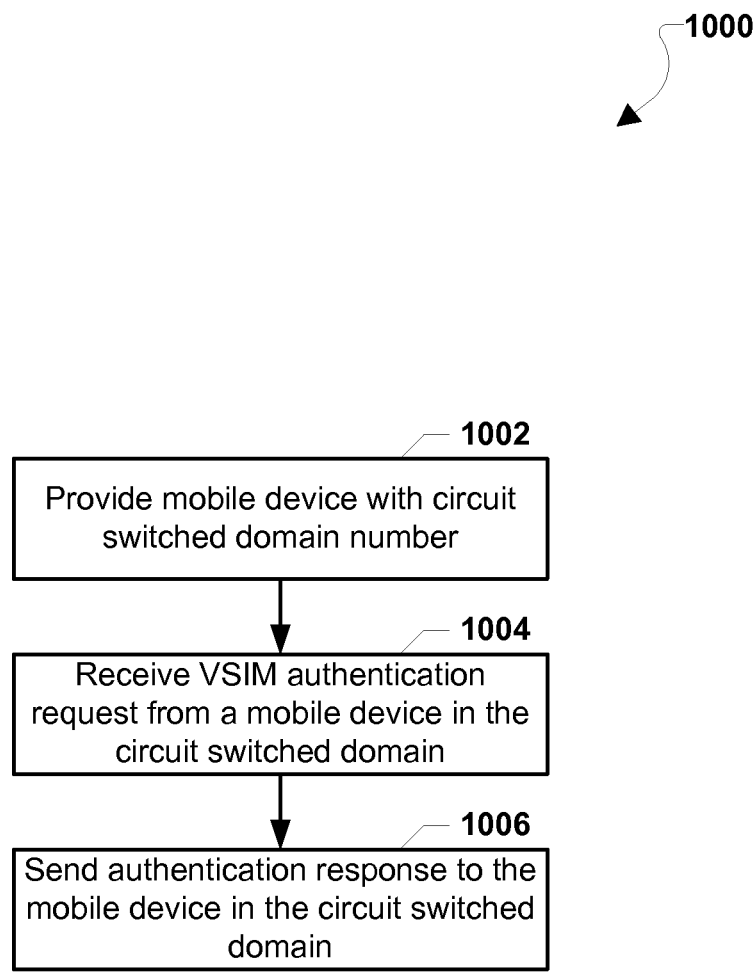
FIG. 10 is a process flow diagram illustrating a method for processing VSIM authentication requests on a server according to various embodiments.

FIG. 10 illustrates a method 1000 for processing a VSIM authentication request on a server according to various embodiments. With reference to FIGS. 1-10, the method 1000 may be implemented in server-executable instructions executing on a VSIM server (such as the remote VSIM server 410) that provides VSIM registration and authentication services to a mobile communication device attempting to connect to the VSIM network.

In block 1002, the VSIM server may provide a mobile communication device with a circuit switched domain number. A VSIM application or the operating system on the mobile communication device may initiate a packet switched connection with the VSIM server. The VSIM server may be configured to send and receive both packet switched domain communications and circuit switched domain communications, such as SMS messages. The VSIM server may provide VSIM registration information to the mobile communication device, which includes the circuit switched domain number. The circuit switched domain number may be a mobile station international subscriber directory number (MSISDN) that the mobile communication device may use to communicate with the remote server in the circuit switched domain. The VSIM registration information may also include a SIM profile for configuring a VSIM module on the mobile communication device to implement a VSIM subscription of the mobile communication device to communicate with a VSIM network, and a temporary identifier (e.g., an IMSI).

In block 1004, the VSIM server may receive a VSIM authentication request in the circuit switched domain from a mobile communication device. The mobile communication device may use the circuit switched domain number provided by the VSIM server to send the authentication request. The authentication request may be formatted in the circuit switched domain, for example as a SMS message. The authentication request may include an authentication token (AUTN) and a random number (RAND) and may be formatted as an AKA calculation request. The VSIM server may store a root key that allows the VSIM server to calculate an authentication response from the authentication request.

In block 1006, the VSIM server may send an authentication response to the mobile communication device using the circuit switched domain number. For example, the authentication response may be formatted as a SMS message. The authentication response may be formatted as an AKA calculation request. In this manner, the method 1000 provides a way for a VSIM server to authenticate a request from a mobile communication device in the circuit switched domain.

Figure 11:
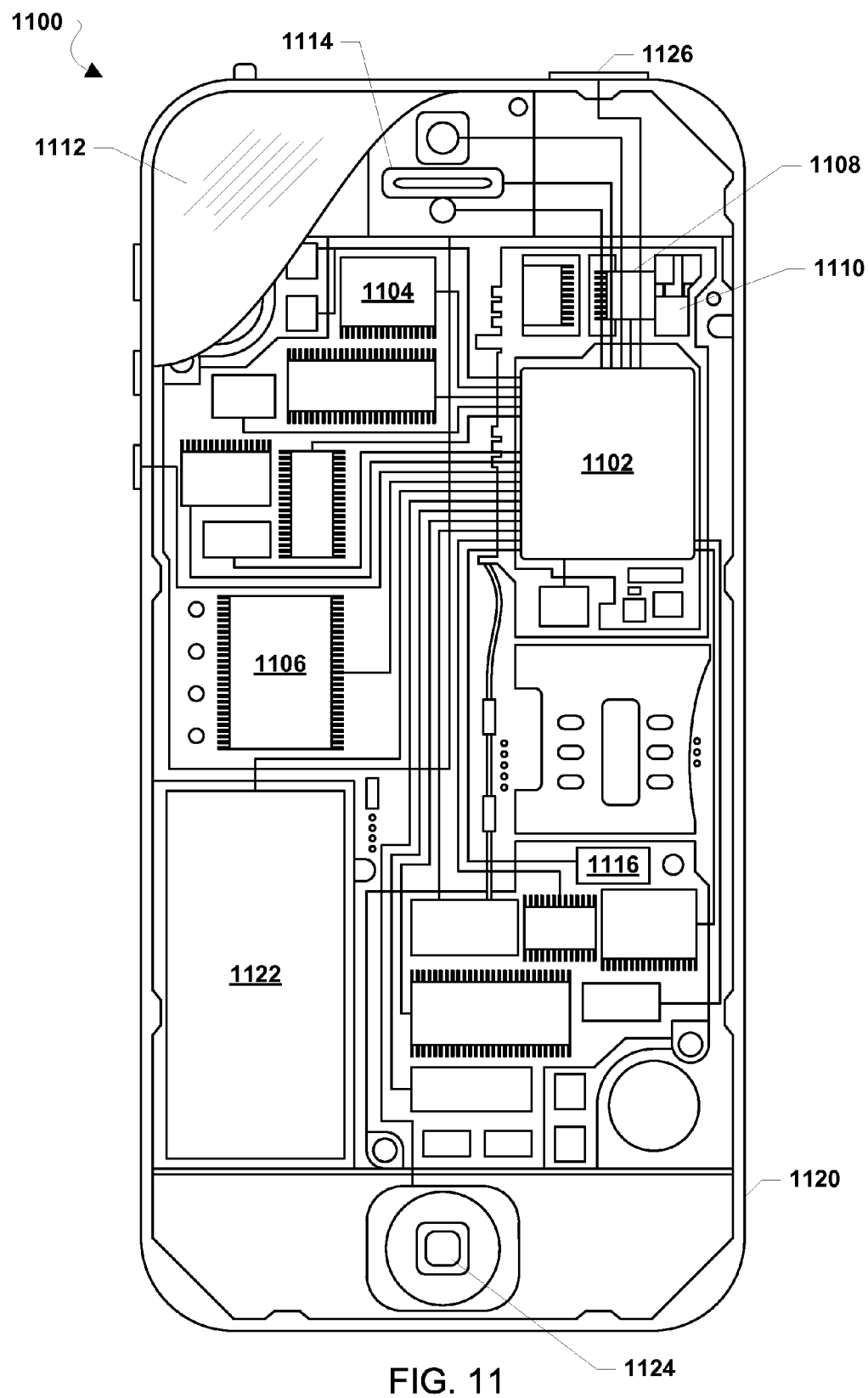
FIG. 11 is a component block diagram of a mobile communication device suitable for implementing some embodiment methods.

Various embodiments may be implemented in any of a variety of mobile communication devices, an example of which (e.g., multi-SIM mobile communication device 1100) is illustrated in FIG. 11. With reference to FIGS. 1-11, the multi-SIM mobile communication device 1100 may be similar to the mobile communication devices 110, 120, 200, 402, 502, and 602 as described. As such, the multi-SIM mobile communication device 1100 may implement the methods 700, 800, and 900 according to various embodiments.

The multi-SIM mobile communication device 1100 may include a processor 1102 coupled to a touchscreen controller 1104 and an internal memory 1106. The processor 1102 may be one or more multi-core integrated circuits designated for general or specific processing tasks. The internal memory 1106 may be volatile or non-volatile memory, and may also be secure and/or encrypted memory, or unsecure and/or unencrypted memory, or any combination thereof. The touchscreen controller 1104 and the processor 1102 may also be coupled to a touchscreen panel 1112, such as a resistive-sensing touchscreen, capacitive-sensing touchscreen, infrared sensing touchscreen, etc. Additionally, the display of the multi-SIM mobile communication device 1100 need not have touch screen capability.

The multi-SIM mobile communication device 1100 may have one or more cellular network transceivers 1108 coupled to the processor 1102 and to one or more antennas 1110 and configured for sending and receiving cellular communications. The one or more transceivers 1108 and the one or more antennas 1110 may be used with the herein-mentioned circuitry to implement various embodiment methods. The multi-SIM mobile communication device 1100 may include one or more SIM cards 1116 coupled to the one or more transceivers 1108 and/or the processor 1102 and may be configured as described herein.

The multi-SIM mobile communication device 1100 may also include speakers 1114 for providing audio outputs. The multi-SIM mobile communication device 1100 may also include a housing 1120, constructed of a plastic, metal, or a combination of materials, for containing all or some of the components discussed herein. The multi-SIM mobile communication device 1100 may include a power source 1122 coupled to the processor 1102, such as a disposable or rechargeable battery. The rechargeable battery may also be coupled to the peripheral device connection port to receive a charging current from a source external to the multi-SIM mobile communication device 1100. The multi-SIM mobile communication device 1100 may also include a physical button 1124 for receiving user inputs. The multi-SIM mobile communication device 1100 may also include a power button 1126 for turning the multi-SIM mobile communication device 1100 on and off.

Figure 12:
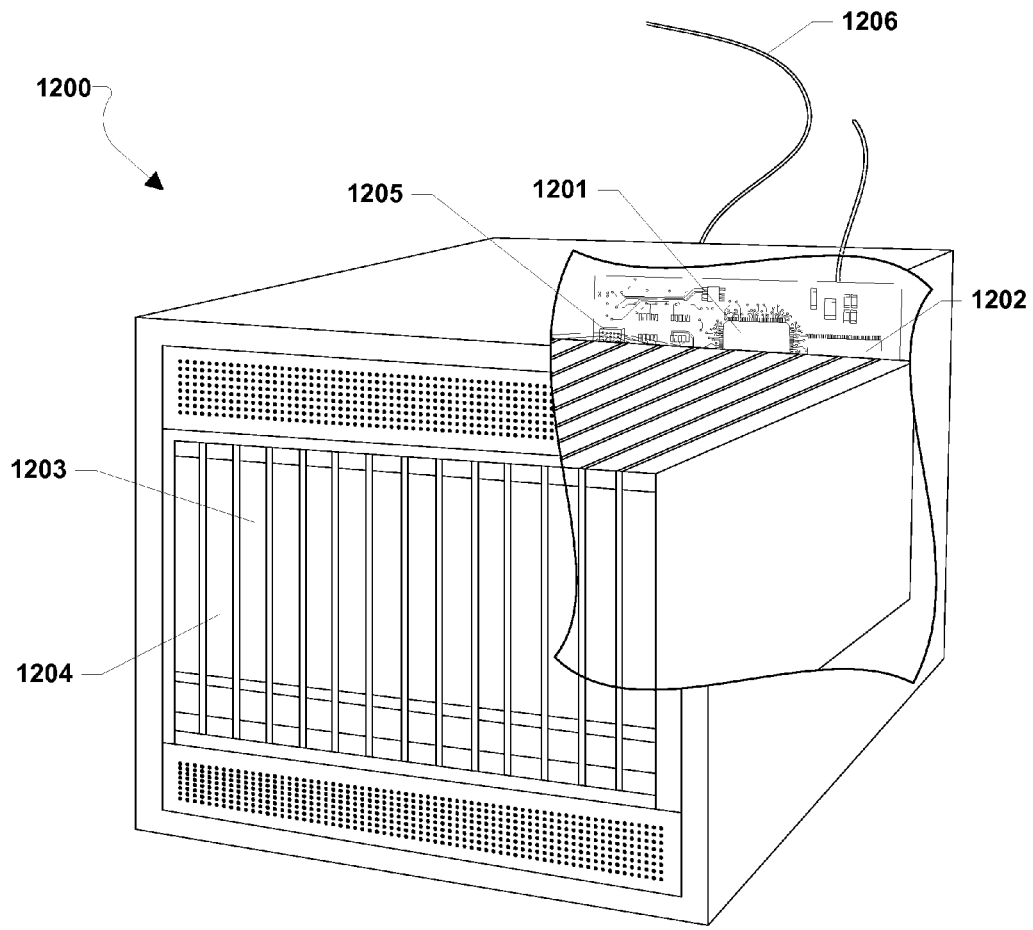
FIG. 12 is a component block diagram of a server device suitable for implementing some embodiment methods.

Portions of some embodiment methods may be accomplished in a client-server architecture with some of the processing occurring in a server (e.g., the remote VSIM server 410, 510, 610). Such embodiments may be implemented on any of a variety of commercially available server devices, such as server device 1200 illustrated in FIG. 12. As such, the server device 1200 may implement the method 1000 in FIG. 10.

Thus, with reference to FIGS. 1-12, the server device 1200 may include a processor 1201 coupled to volatile memory 1202 and a large capacity nonvolatile memory, such as a disk drive 1203. The server device 1200 may also include a floppy disc drive, compact disc (CD) or digital versatile disk (DVD) disc drive 1204 coupled to the processor 1201. The server device 1200 may also include network access ports 1205 coupled to the processor 1201 for establishing data connections with a network 1206, such as a local area network coupled to other broadcast system computers and servers. The processor 1201 may be any programmable microprocessor, microcomputer or multiple processor chip or chips that can be configured by software instructions (applications) to perform a variety of functions, including the functions of the various aspects described herein. Typically, software applications may be stored in the internal memories 1202, 1203 before they are accessed and loaded into the processor 1201. The processor 1201 may include internal memory sufficient to store the application software instructions.

The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the steps of various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configurations. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, DVD, floppy disk, and Blu-ray disc where disks usually reproduce data magnetically, while discs reproduce data optically with lasers. Combinations of memory described herein are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the present embodiments. Various modifications to these embodiments will be readily apparent to those skilled in the art, and the generic principles defined herein may be applied to some embodiments without departing from the spirit or scope of the written description. Thus, the present disclosure is not intended to be limited to the embodiments shown herein but is to be accorded the widest scope consistent with the following claims and the principles and novel features disclosed herein.

What is claimed is:

1. A method for performing remote authentication of a virtual subscriber identity module (SIM) on a mobile communication device, comprising:
    receiving, on a first subscription of the mobile communication device, an authentication request from a virtual SIM network;
    tuning from the first subscription to a second subscription of the mobile communication device to send the authentication request to a remote server;
    periodically performing tune-aways between the first subscription and the second subscription;
    determining whether the remote server has sent an authentication response through the second subscription; and
    sending the authentication response to the virtual SIM network through the first subscription in response to determining that the remote server has sent the authentication response through the second subscription.

2. The method of claim 1, wherein periodically performing tune-aways between the first subscription and the second subscription comprises periodically performing a tune-away from the second subscription to the first subscription.

3. The method of claim 1, wherein periodically performing tune-aways between the first subscription and the second subscription comprises:
    tuning from the second subscription to the first subscription; and
    periodically performing a tune-away from the first subscription to the second subscription.

4. The method of claim 3, wherein the second subscription communicates with the remote server in a circuit switched domain.

5. The method of claim 4, wherein the mobile communication device uses a circuit switched domain number provided by the remote server to communicate with the remote server.

6. The method of claim 4, further comprising formatting the authentication request as a short message service (SMS) message to send to the remote server.

7. The method of claim 4, wherein the authentication response received from the remote server is formatted as a short message service (SMS) message.

8. The method of claim 1, wherein the second subscription communicates with the remote server in a packet switched domain.

9. The method of claim 1, further comprising sending fake uplink data to the virtual SIM network using the first subscription while periodically performing tune-aways between the first subscription and the second subscription.

10. A method for performing remote authentication of a virtual subscriber identity module (SIM) on a mobile communication device, comprising:
    receiving, on a first subscription of the mobile communication device, an authentication request from a virtual SIM network;
    tuning from the first subscription to a second subscription of the mobile communication device to send the authentication request to a remote server;
    determining whether the remote server has sent an authentication response through the second subscription, wherein the mobile communication device restricts communication on the second subscription to authentication communication; and
    sending the authentication response to the virtual SIM network through the first subscription in response to determining that the remote server has sent the authentication response through the second subscription.

11. The method of claim 10, wherein the mobile communication device restricts communication on the second subscription to authentication communication by setting a flag in a modem of the mobile communication device that indicates only authentication communication is permitted.

12. A mobile communication device, comprising:
    a RF resource; and
    a processor coupled to the RF resource and a user identity module supporting a first subscription, the processor configured to connect to a subscriber identity (SIM) associated with a second subscription, and configured with processor-executable instructions to:
        receive on the first subscription an authentication request from a virtual SIM network;
        tune from the first subscription to the second subscription to send the authentication request to a remote server;
        periodically perform tune-aways between the first subscription and the second subscription;
        determine whether the remote server has sent an authentication response through the second subscription; and
        send the authentication response to the virtual SIM network through the first subscription in response to determining that the remote server has sent the authentication response through the second subscription.

13. The mobile communication device of claim 12, wherein the processor is configured with processor-executable instructions to periodically perform tune-aways between the first subscription and the second subscription by periodically performing a tune-away from the second subscription to the first subscription.

14. The mobile communication device of claim 12, wherein the processor is configured with processor-executable instructions to periodically perform tune-aways between the first subscription and the second subscription by:
   tuning from the second subscription to the first subscription; and
   periodically performing a tune-away from the first subscription to the second subscription.

15. The mobile communication device of claim 14, wherein the second subscription communicates with the remote server in a circuit switched domain.

16. The mobile communication device of claim 14, wherein the mobile communication device uses a circuit switched domain number provided by the remote server to communicate with the remote server.

17. The mobile communication device of claim 14, wherein the processor is further configured with processor-executable instructions to format the authentication request as a short message service (SMS) message to send to the remote server.

18. The mobile communication device of claim 14, wherein the authentication response received from the remote server is formatted as a SMS message.

19. The mobile communication device of claim 12, wherein the second subscription communicates with the remote server in a packet switched domain.

20. The mobile communication device of claim 12, wherein the processor is further configured with processor-executable instructions to send fake uplink data to the virtual SIM network using the first subscription while periodically performing tune-aways between the first subscription and the second subscription.

21. A mobile communication device, comprising:
   a RF resource; and
   a processor coupled to the RF resource and a user identity module associated with a first subscription, the processor configured to connect to a subscriber identity (SIM) associated with a second subscription, and configured with processor-executable instructions to:
      receive on the first subscription an authentication request from a virtual SIM network;
      tune from the first subscription to the second subscription to send the authentication request to a remote server;
      determine whether the remote server has sent an authentication response through the second subscription, wherein the mobile communication device restricts communication on the second subscription to authentication communication; and
      send the authentication response to the virtual SIM network through the first subscription in response to determining that the remote server has sent the authentication response through the second subscription.

22. The mobile communication device of claim 21, wherein the processor is configured with processor-executable instructions to monitor the second subscription for the authentication response by setting a flag in a modem of the mobile communication device that indicates only authentication communication is permitted.

* * * * *